US012715318B2

(12) United States Patent
Nasr et al.

(10) Patent No.: US 12,715,318 B2
(45) Date of Patent: Aug. 25, 2026

(54) THERMAL MANAGEMENT SYSTEM FOR WIRELESS CHARGING

(71) Applicant: Oshkosh Corporation, Oshkosh, WI (US)

(72) Inventors: Nader Nasr, Neenah, WI (US); Chad Smith, Omro, WI (US); Mike J. Bolton, Oshkosh, WI (US); Colin Wheeler, Oshkosh, WI (US); Mitchel Nordahl, Oshkosh, WI (US); Christopher Yakes, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 770 days.

(21) Appl. No.: 18/158,049

(22) Filed: Jan. 23, 2023

(65) Prior Publication Data

US 2023/0234455 A1 Jul. 27, 2023

Related U.S. Application Data

(60) Provisional application No. 63/302,489, filed on Jan. 24, 2022.

(51) Int. Cl.

| | |
|---|---|
| ***B60L 53/12*** | (2019.01) |
| ***B60H 1/00*** | (2006.01) |
| ***B60L 58/27*** | (2019.01) |

(52) U.S. Cl.

CPC .......... *B60L 53/12* (2019.02); *B60H 1/00035* (2013.01); *B60H 1/00278* (2013.01);

(Continued)

(58) Field of Classification Search

CPC .......... B60L 53/12; B60L 58/27; B60L 50/64; B60L 50/66; B60L 2200/40; B60L 2240/545; B60L 58/26; B60H 1/00035; B60H 1/00278; B60H 1/00878; B60H 2001/00128; B60H 2001/00178; B60H 2001/00942; B60K 1/04; B60K 2001/005; B60K 2001/008; B60Y 2200/14;

(Continued)

(56) References Cited

U.S. PATENT DOCUMENTS 7,147,071 B2 * 12/2006 Gering .................... B60H 1/08 165/41
8,449,997 B2 * 5/2013 Hermann ............... B60L 53/14 429/62

(Continued)

FOREIGN PATENT DOCUMENTS

CN 104044479 B * 11/2017 .............. B60L 58/26
WO WO-2011150085 A1 * 12/2011 ................ B60L 1/02

*Primary Examiner* — M Baye Diao
(74) *Attorney, Agent, or Firm* — Foley & Lardner LLP

(57) ABSTRACT

A thermal management system for a vehicle includes a wireless charging coil configured to provide thermal energy, a first heat exchanger thermally coupled to the wireless charging coil, a radiator thermally coupled to the first heat exchanger and configured to transfer a first portion of the thermal energy provided by the wireless charging coil to an interior of a passenger compartment of the vehicle, and a second heat exchanger thermally coupled to the first heat exchanger and configured to transfer a second portion of the thermal energy provided by the wireless charging coil to a battery of the vehicle.

19 Claims, 18 Drawing Sheets

(52) U.S. Cl.
CPC .......... *B60H 1/00878* (2013.01); *B60L 58/27* (2019.02); *B60H 2001/00128* (2013.01); *B60H 2001/00178* (2013.01); *B60H 2001/00942* (2013.01)

(58) Field of Classification Search
CPC . B60Y 2200/41; Y02T 10/70; Y02T 10/7072; Y02T 90/14
USPC .......................................................... 320/108
See application file for complete search history.

(56) References Cited

U.S. PATENT DOCUMENTS

| | | | | |
|---|---|---|---|---|
| 9,878,631 | B2 * | 1/2018 | Hyde | B60L 1/14 |
| 9,895,981 | B2 * | 2/2018 | Cimatti | B60L 50/51 |
| 10,272,758 | B2 * | 4/2019 | Grace | H01M 10/48 |
| 11,440,392 | B2 * | 9/2022 | Grace | H01M 10/6568 |
| 11,567,503 | B1 * | 1/2023 | Roy | G05D 1/028 |
| 11,745,612 | B1 * | 9/2023 | Ocampo Villegas | B60L 53/122 429/120 |
| 2015/0060169 | A1 * | 3/2015 | Janarthanam | H01M 10/625 429/82 |
| 2015/0239365 | A1 * | 8/2015 | Hyde | B60L 58/26 701/2 |
| 2016/0181849 | A1 * | 6/2016 | Govindaraj | H02J 7/0044 320/108 |

* cited by examiner 10
20
414
470
412
410
450
442
460
44

THERMAL MANAGEMENT SYSTEM FOR WIRELESS CHARGING

CROSS-REFERENCE TO RELATED PATENT APPLICATIONS

This application claims the benefit of and priority to U.S. Provisional Patent Application No. 63/302,489, filed on Jan. 24, 2022, the entire disclosure of which is hereby incorporated by reference herein.

BACKGROUND

A vehicle may include an onboard energy storage device, such as a battery, that powers one or more electric motors to propel or otherwise drive the vehicle. In a hybrid configuration, the mechanical energy output of the electric motors may be supplemented with an internal combustion engine.

SUMMARY

At least one embodiment relates to a thermal management system for a vehicle. The thermal management system includes a wireless charging coil configured to provide thermal energy, a first heat exchanger thermally coupled to the wireless charging coil, a radiator thermally coupled to the first heat exchanger and configured to transfer a first portion of the thermal energy provided by the wireless charging coil to an interior of a passenger compartment of the vehicle, and a second heat exchanger thermally coupled to the first heat exchanger and configured to transfer a second portion of the thermal energy provided by the wireless charging coil to a battery of the vehicle Another embodiment relates to a thermal management system for a vehicle. The thermal management system includes a wireless charging coil, a coolant pump configured to provide a flow of fluid at an outlet, a first heat exchanger thermally coupled to the wireless charging coil and arranged downstream of the outlet, and a second heat exchanger thermally coupled to a battery of the vehicle and arranged downstream of the first heat exchanger. The first heat exchanger transfers heat energy output by the wireless charging coil to the flow of fluid, and the second heat exchanger receives the flow of fluid and transfers heat from the flow of fluid to the battery.

Another embodiment relates to a vehicle. The vehicle includes a chassis, a cab supported on the chassis and defining a cab interior, a battery, a wireless charging coil adapted to receive electrical energy from an external wireless charging coil and supply the electrical energy to the battery, and a thermal management system. The thermal management system includes a first heat exchanger thermally coupled to the wireless charging coil and configured to receive thermal energy from the wireless charging coil, a second heat exchanger thermally coupled to the battery and configured to supply thermal energy from the wireless charging coil to the battery, a battery temperature sensor configured to detect a temperature of the battery, and a battery shutoff valve arranged upstream of the second heat exchanger. The vehicle further includes a controller in communication with the wireless charging coil and the battery temperature sensor. The controller includes a processor and a memory. The memory stores instructions that, when executed by the processor, cause the processor to: detect the temperature of the battery, and instruct the battery shutoff valve to close if the temperature of the battery is above a threshold temperature.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Vehicle Configuration

Figure 1:
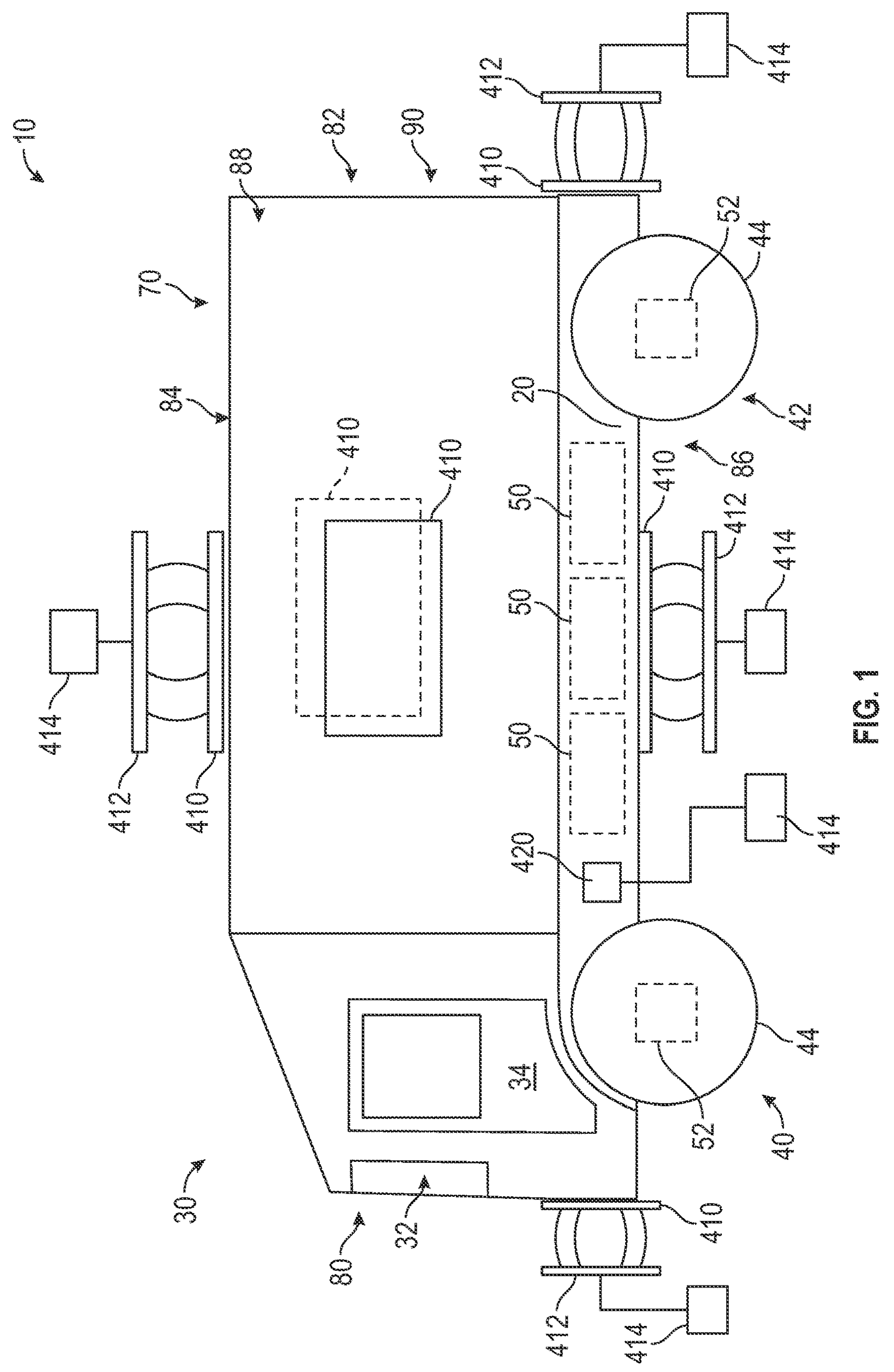
FIG. 1 is a right side view of a vehicle, according to an exemplary embodiment.
Figure 2:
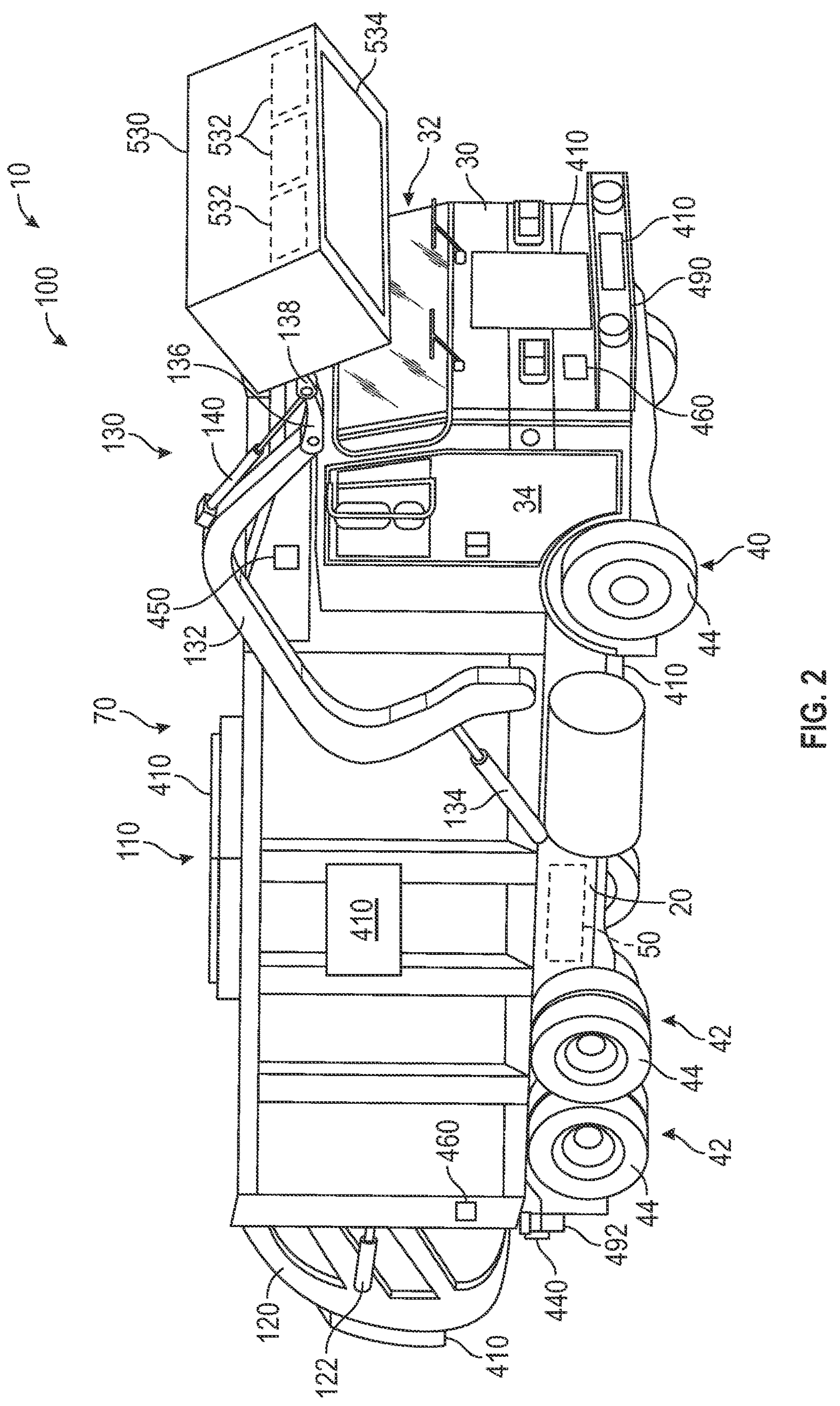
FIG. 2 is a front, left perspective view of the vehicle of FIG. 1 configured as a front-loading refuse vehicle, according to an exemplary embodiment.

Referring to FIGS. 1 and 2, a vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. In some embodiments, the chassis 20 includes a pair of frame rails that extend along a length of the vehicle 10. In other embodiments, the chassis 20 is otherwise configured (e.g., as a single, continuous piece, etc.).

A cabin or operator compartment, shown as cab 30, is coupled to a front end portion of the chassis 20. Together, the chassis 20 and the cab 30 define a front end of the vehicle 10. The cab 30 extends above the chassis 20. The cab 30 includes an enclosure or main body that defines an interior volume, shown as cab interior 32, that is sized to contain one or more operators. The cab 30 also includes one or more doors 34 that facilitate selective access to the cab interior 32 from outside of the vehicle 10. The cab interior 32 contains one or more components that facilitate operation of the vehicle 10 by the operator. By way of example, the cab interior 32 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 30 may facilitate operator control over the drive components of the vehicle 10 and/or over any implements of the vehicle 10.

The vehicle 10 further includes a series of axle assemblies or drive assemblies, shown as front axle 40 and rear axle 42. As shown, the vehicle 10 includes one front axle 40 coupled to the chassis 20 near a front end of the vehicle 10 and a rear axle 42 coupled to the chassis 20 near a rear end of the vehicle 10. In other embodiments, the vehicle 10 includes more or fewer axles (e.g., two rear axles 42 in a tandem arrangement). By way of example, the vehicle 10 may include a tag axle that may be raised or lowered to accommodate variations in weight being carried by the vehicle 10. The front axle 40 and the rear axles 42 each include a plurality of tractive elements (e.g., wheels, treads, etc.), shown as wheel and tire assemblies 44. The wheel and tire assemblies 44 are configured to engage a support surface (e.g., roads, the ground, etc.) to support and propel the vehicle 10. The front axle 40 and the rear axle 42 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 50. As shown, the batteries 50 are positioned within and coupled to the chassis 20. In other embodiments, the batteries 50 are otherwise positioned throughout the vehicle 10. The vehicle 10 further includes one or more electromagnetic devices (e.g., motor/generators), shown as drive motors 52. The drive motors 52 are electrically coupled to the batteries 50. The drive motors 52 may be configured to receive electrical energy from the batteries 50 and provide rotational mechanical energy to the wheel and tire assemblies 44 to propel the vehicle 10. The drive motors 52 may be configured to receive rotational mechanical energy from the wheel and tire assemblies 44 and provide electrical energy to the batteries 50, providing a braking force to slow the vehicle 10 (i.e., may perform regenerative braking). As shown, the drive motors 52 are positioned within the front axle 40 and the rear axles 42 (e.g., as part of a combined axle and motor assembly). In other embodiments, the drive motors 52 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide the axle front axle 40 and/or the rear axles 42 to propel the vehicle 10. Additionally or alternatively, the primary driver may provide mechanical energy to the generator, which converts the mechanical energy into electrical energy. The electrical energy may be stored in the energy storage device (e.g., the batteries 50) in order to later be provided to a motive driver.

Referring to FIG. 1, the vehicle 10 includes a rear assembly, module, implement, body, or cargo area, or application kit, shown as body assembly 70. The body assembly 70 may include one or more implements, vehicle bodies, and/or other components. Although the body assembly 70 is shown positioned behind the cab 30, the body assembly 70 may extends above or forward of the cab 30. The configuration of the body assembly 70 may vary depending upon the intended application of the vehicle 10. By way of example, the vehicle 10 may be configured as a refuse vehicle (e.g., a front loading refuse vehicle, a side loading refuse vehicle, etc.), a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another type of vehicle. FIGS. 2-5 illustrate various examples of how the vehicle 10 may be configured for specific applications. Although only a certain set of vehicle configurations is shown, it should be understood that the vehicle 10 may be configured for use in other applications that are not shown.

The body assembly 70 may include various actuators to facilitate certain functions of the vehicle 10. By way of example, the body assembly 70 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The body assembly 70 may include components that facilitate operation of and/or control of these actuators. By way of example, the body assembly 70 may include hydraulic or pneumatic components that form a hydraulic or pneumatic circuit (e.g., conduits, valves, pumps, compressors, gauges, reservoirs, accumulators, etc.). By way of another example, the body assembly 70 may include electrical components (e.g., batteries, capacitors, voltage regulators, motor controllers, etc.). The actuators may be powered by components of the vehicle 10. By way of example, the actuators may be powered by the batteries 50, the drive motors 52, or the primary driver (e.g., through a power take off). The body assembly 70 may include one or more structures to facilitate certain functions of the vehicle (e.g., refuse compartments, mixing drums, ladders, etc.).

Referring still to FIG. 1, the chassis 20 and the cab 30 define a front side 80 of the vehicle 10. The chassis 20 and the body assembly 70 define a rear side 82 of the vehicle 10 opposite the front side 80. The front side 80 is longitudinally offset from the rear side 82. The cab 30 and the body assembly 70 define a top side 84 of the vehicle 10. The chassis 20, the cab 30, and the body assembly 70 define a bottom side 86 of the vehicle 10 opposite the top side 84. The top side 84 is vertically offset from the bottom side 86. The chassis 20, the cab 30, and the body assembly 70 define a left side 88 of the vehicle 10. The chassis 20, the cab 30, and the body assembly 70 define a right side 90 of the vehicle 10 opposite the left side 88. The left side 88 is laterally offset from the right side 90.

Figure 5:
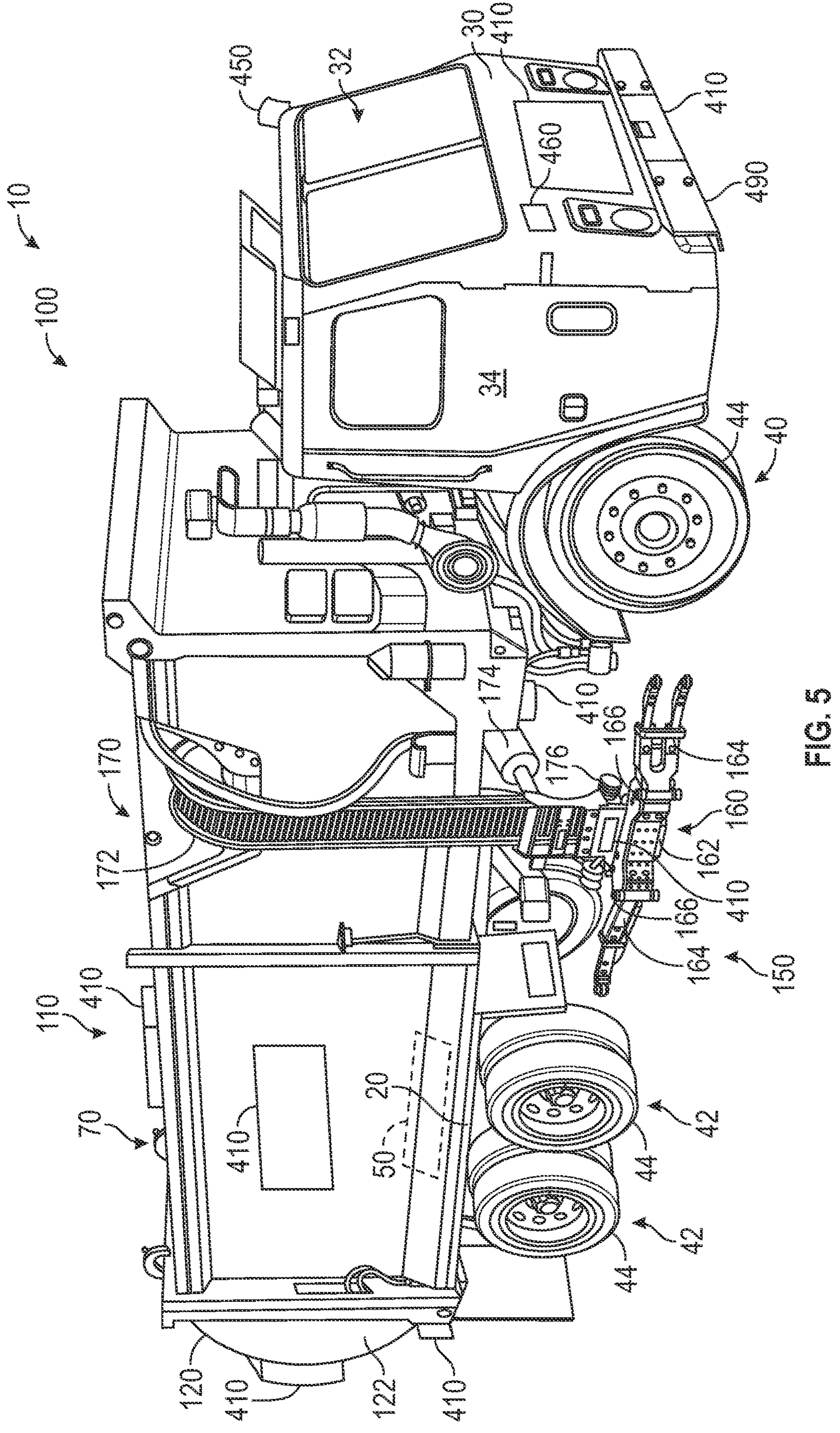
FIG. 5 is a front, left perspective view of the vehicle of FIG. 1 configured as a side-loading refuse vehicle, according to an exemplary embodiment.

Referring now to FIG. 2, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a side-loading refuse vehicle (e.g., as shown in FIG. 5).

As shown in FIG. 2, the body assembly 70 of the refuse vehicle 100 includes a rear body or container, shown as refuse compartment 110, and a pivotable rear portion, shown as tailgate 120. The refuse compartment 110 may facilitate transporting refuse from various waste receptacles within a municipality to a storage and/or a processing facility (e.g., a landfill, an incineration facility, a recycling facility, etc.). By way of example, loose refuse may be placed into the refuse compartment 110 where it may be compacted. The refuse compartment 110 may also provide temporary storage for refuse during transport to a waste disposal site and/or a recycling facility. In some embodiments, the refuse compartment 110 may include a hopper volume and storage volume. In this regard, refuse may be initially loaded into the hopper volume and later compacted into the storage volume. According to an exemplary embodiment, the hopper volume may be positioned between the storage volume and the cab 30 (e.g., refuse is loaded into a position of the refuse compartment 110 behind the cab 30 and stored in a position further toward the rear of the refuse compartment 110). In other embodiments, the storage volume may be positioned between the hopper volume and the cab 30 (e.g., in a rear-loading refuse truck, etc.). The tailgate 120 may be pivotally coupled to the refuse compartment 110, and may be movable between a closed position and an open position by an actuator (e.g., a hydraulic cylinder, an electric linear actuator, etc.), shown as tailgate actuator 122 (e.g., to facilitate emptying the storage volume).

Figure 3:
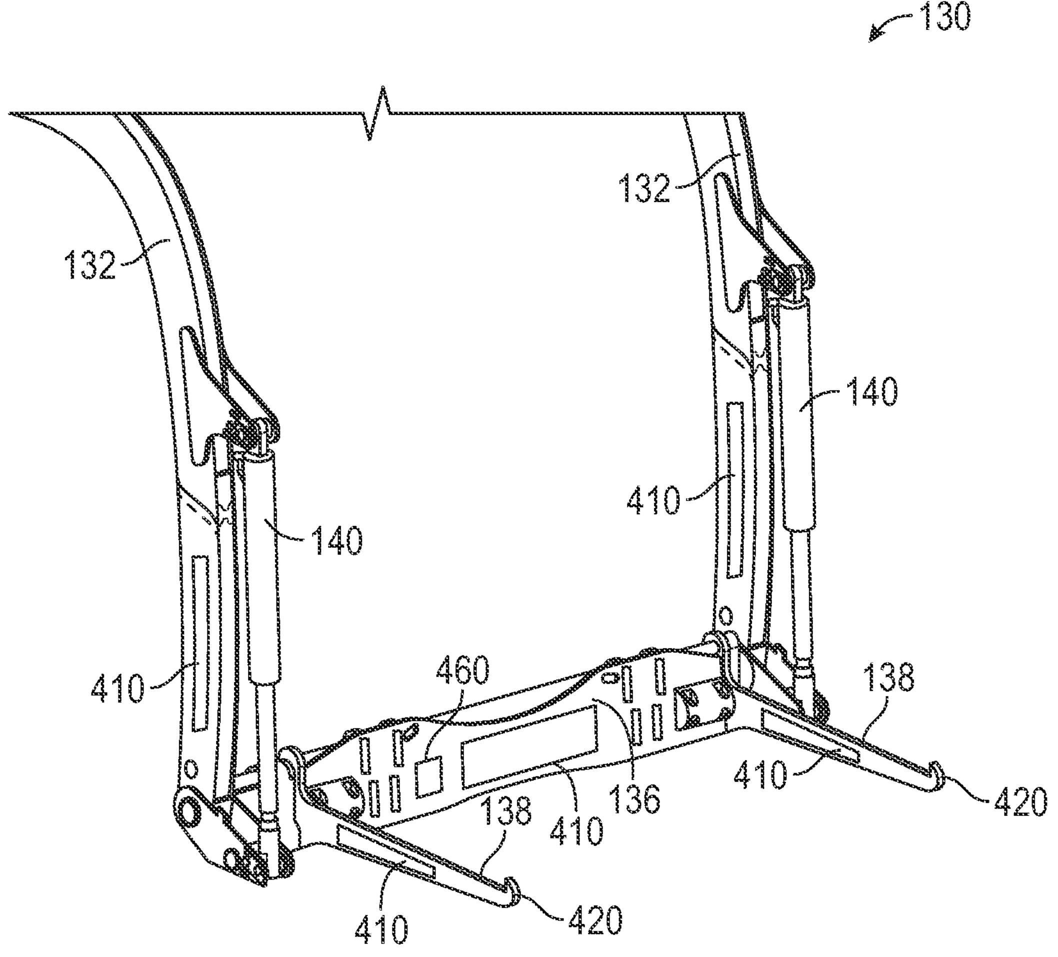
FIG. 3 is a front, left perspective view of a lift assembly of the front-loading refuse vehicle of FIG. 2.
Figure 4:
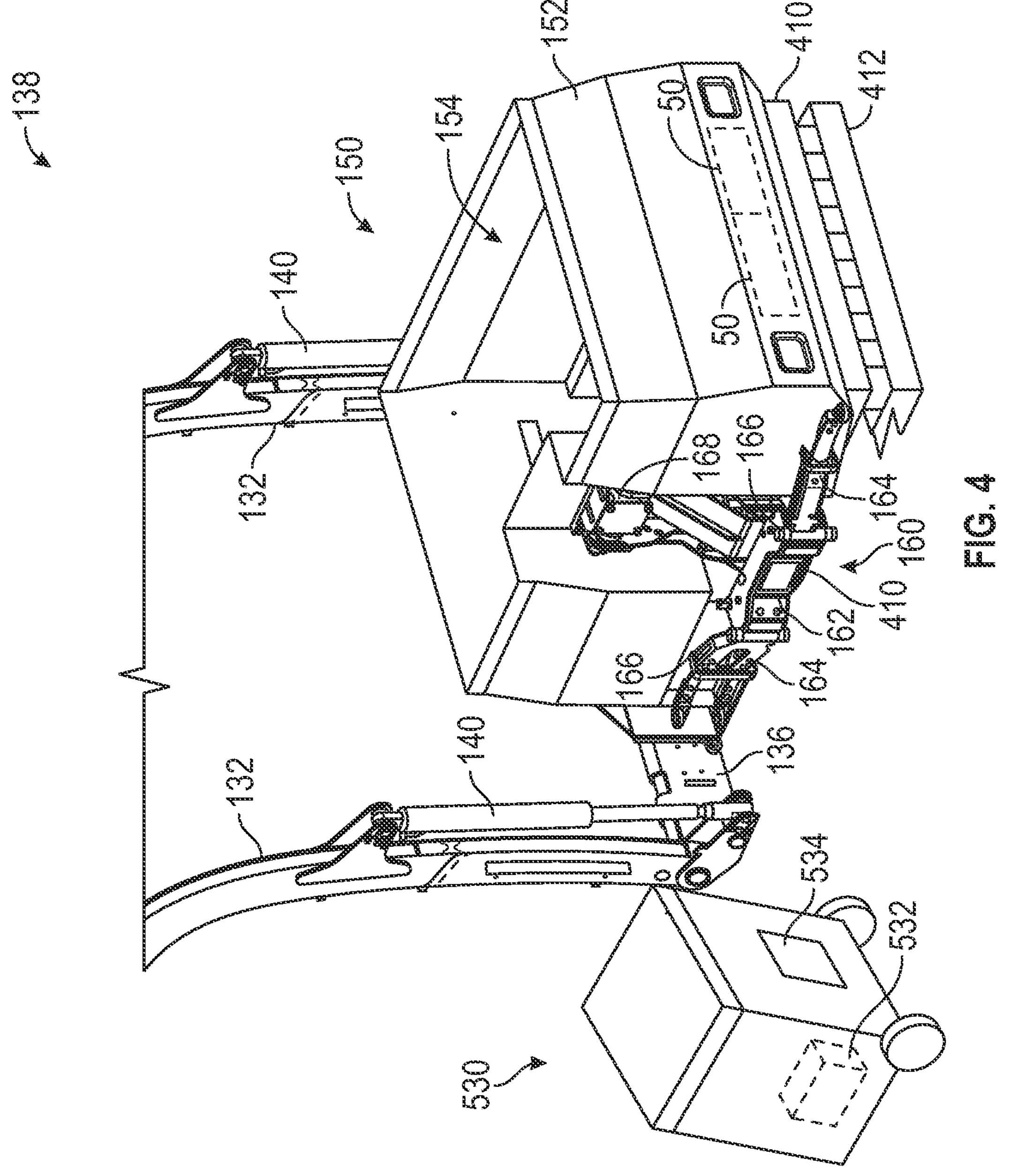
FIG. 4 is a front, left perspective view of the lift assembly of FIG. 3 equipped with a carry can, according to an exemplary embodiment.

As shown in FIG. 2-4, the refuse vehicle 100 also includes an implement or front-loading lift assembly, shown as lift assembly 130 (e.g., a front-loading lift assembly, etc.). According to an exemplary embodiment, the lift assembly 130 includes a pair of lift arms 132. The lift arms 132 may be rotatably coupled to the chassis 20 and/or the refuse compartment 110 on each side of the refuse vehicle 100 (e.g., through a pivot, a lug, a shaft, etc.), such that the lift assembly 130 may extend forward relative to the cab 30 (e.g., a front-loading refuse truck, etc.). In other embodiments, the refuse vehicle 100 is configured as a rear-loading refuse truck, and the lift assembly 130 extends rearward relative to the body assembly 70. As shown in FIG. 2, a pair of actuators (e.g., linear actuators, hydraulic cylinders, electric actuators, etc.), shown as lift arm actuators 134, are coupled to the chassis 20 and the lift arms 132. Extension and retraction of the lift arms 132 causes rotation of the lift arms 132 relative to the chassis 20 and the refuse compartment 110 about an axis extending through a pivot at the base of the lift arms 132.

Pivotally coupled to the lift arms 132 is a lateral member, shown as backing plate 136. The backing plate 136 extends laterally between the lift arms 132 and is coupled to a distal end of each lift arm 132. A pair of interface members, shown as lift forks 138, are each coupled to the backing plate 136. The lift forks 138 are laterally offset from one another and each extend forward from the backing plate 136. The lift forks 138 may be received with a corresponding pair of fork pockets of a refuse container (e.g., a dumpster) to engage the refuse container with the lift assembly 130.

As shown in FIG. 2-4, a pair of actuators (e.g., linear actuators, hydraulic cylinders, electric actuators, etc.), shown as articulation actuators 140, are positioned to articulate the lift forks 138 and the backing plate 136 relative to the lift arms 132. In operation, the lift arm actuators 134 may be used to rotate the lift arms 132 to lift the refuse container over the hopper portion of the refuse compartment 110. The articulation actuators 140 may be used to shake the refuse container to facilitate tipping refuse out of the refuse container and into the hopper portion of the refuse compartment 110. The lift arm actuators 134 may then rotate the lift arms 132 to return the empty refuse container to the ground.

In some embodiments, as shown in FIG. 4, the refuse vehicle 100 of FIG. 2 is usable with a refuse collection container or collection assembly, shown as carry can 150. The carry can 150 may act as an intermediate collection container, permitting the front-loading refuse vehicle 100 to collect residential refuse containers. The carry can 150 includes a container portion, shown as container 152, defining an intermediate storage volume, shown as volume 154. The carry can 150 includes a can interface, shown as grabber assembly 160. The grabber assembly 160 includes a base portion, shown as base 162, and a pair of articulating portions, shown as fingers 164. The fingers 164 are each pivotally coupled to the base 162. The grabber assembly 160 includes a pair of first actuators (e.g., electric or hydraulic motors), shown as finger actuators 166, that are configured to articulate the fingers 164 relative to the base 162. A second actuator (e.g., electric or hydraulic motors), shown as grabber lift actuator 168. The grabber lift actuator 168 is coupled to the base 162 and the container 152 and configured to lift the grabber assembly 160 relative to the container 152.

In operation, a refuse container is placed nearby the grabber assembly 160. The finger actuators 166 may be used to move the fingers 164 into engagement with the refuse container, coupling the refuse container to the grabber assembly 160. The grabber lift actuator 168 may be used to lift the grabber assembly 160 and empty the refuse container into the volume 154. The grabber lift actuator 168 may be used to lower the grabber assembly 160, and the finger actuators 166 may be used to release the refuse container. This process may be repeated with several refuse containers. The lift assembly 130 may be used to empty the container 152 into the refuse compartment 110.

Referring to FIG. 5, an alternative configuration of the refuse vehicle 100 is shown according to another exemplary embodiment. Specifically, the refuse vehicle 100 is configured as a side-loading refuse vehicle. In this embodiment, the refuse vehicle 100 includes an implement or side-loading lift assembly, shown as lift assembly 170, that is configured to empty refuse containers (e.g., residential refuse containers) into the hopper portion of the refuse compartment 110. The lift assembly 170 may extend from a left or right side of the refuse compartment 110. The lift assembly 170 includes a guide, shown as track 172, extending vertically along an exterior of the refuse compartment 110. An actuator (e.g., a linear actuator, an electric actuator, a hydraulic actuator, etc.), shown as grabber extension actuator 174, is coupled to the track 172 and the chassis 20. The grabber extension actuator 174 extends and retracts to move the track 172 laterally relative to the chassis 20. A grabber assembly 160 is slidably coupled to the track 172. An actuator (e.g., electric or hydraulic motors), shown as grabber lift actuator 176, is configured to move the grabber assembly 160 along the length of the track 172. The track 172 may be shaped such that a refuse container engaged by the grabber assembly 160 is automatically emptied as the grabber assembly 160 moves along the length of the track 172.

Figure 6:
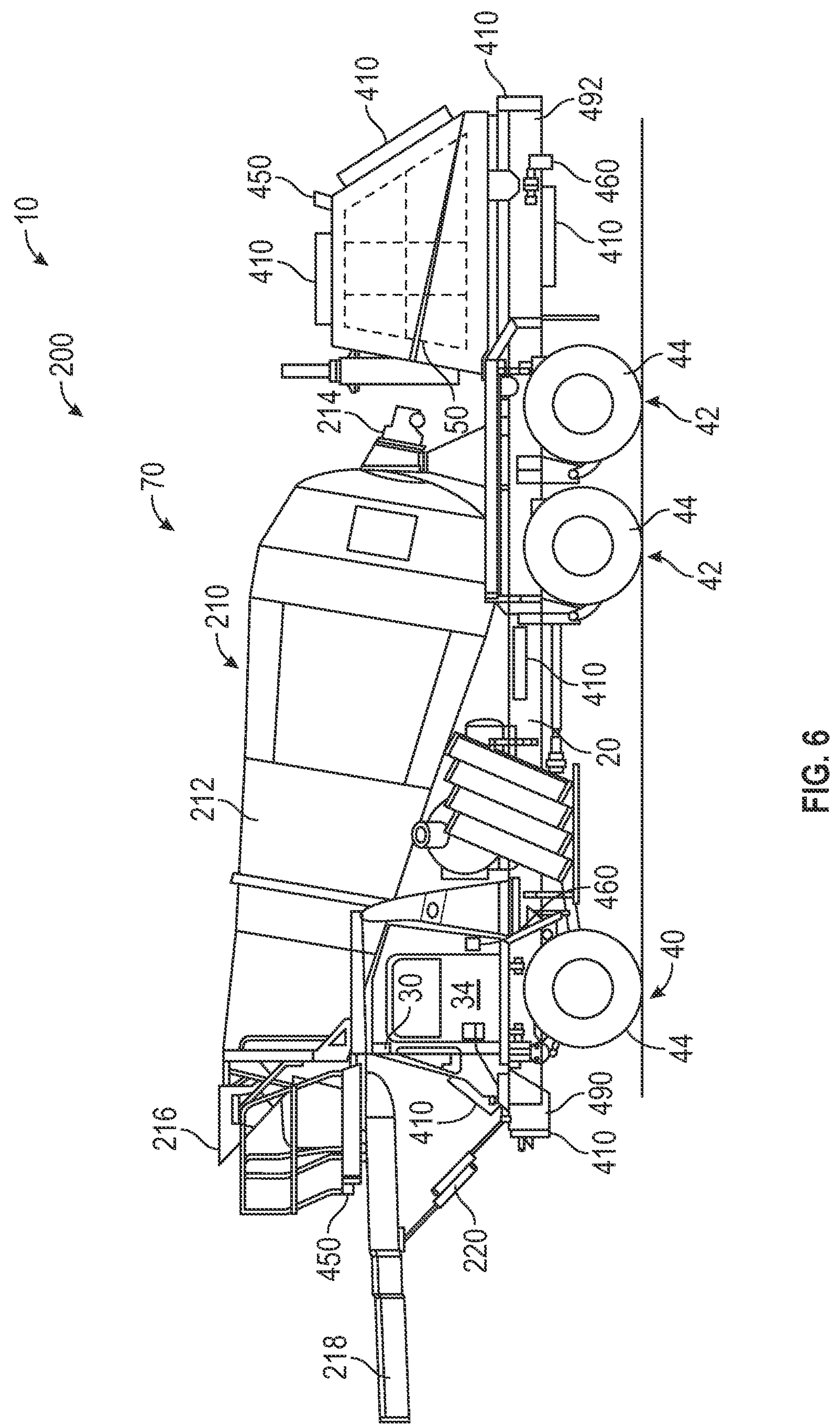
FIG. 6 is a right side view of the vehicle of FIG. 1 configured as a front-discharge concrete mixer truck, according to an exemplary embodiment.

Referring now to FIG. 6, the vehicle 10 is configured as a mixer truck (e.g., a concrete mixer truck, a mixer vehicle, etc.), shown as mixer truck 200. Specifically, the mixer truck 200 is shown as a front-discharge concrete mixer truck. In other embodiments, the mixer truck 200 is a rear-discharge concrete mixer truck.

As shown in FIG. 6, the body assembly 70 includes a mixing drum assembly (e.g., a concrete mixing drum), shown as drum assembly 210. The drum assembly 210 may include a mixing drum 212, a drum drive system 214 (e.g., a rotational actuator or motor), an inlet, shown as hopper 216, and an outlet, shown as chute 218. The orientation of the chute 218 may be controlled by the extension and retraction of a linear actuator, shown as chute actuator 220. The mixing drum 212 may be coupled to the chassis 20 and may be disposed behind the cab 30 (e.g., at the rear and/or middle of the chassis 20). In an exemplary embodiment, the drum drive system 214 is coupled to the chassis 20 and configured to selectively rotate the mixing drum 212 about a central, longitudinal axis. According to an exemplary embodiment, the central, longitudinal axis of the mixing drum 212 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 212 may be configured to receive a mixture, such as a concrete mixture (e.g., cementitious material, aggregate, sand, etc.), through the hopper 216. In some embodiments, the mixer truck 200 includes an injection system (e.g., a series of nozzles, hoses, and/or valves) including an injection valve that selectively fluidly couples a supply of fluid to the inner volume of the mixing drum 212. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 212. The injection valve may facilitate injecting water and/or chemicals from a fluid reservoir (e.g., a water tank, etc.) into the mixing drum 212, while preventing the mixture in the mixing drum 212 from exiting the mixing drum 212 through the injection system. In some embodiments, one or more mixing elements (e.g., fins, etc.) may be positioned in the interior of the mixing drum 212, and may be configured to agitate the contents of the mixture when the mixing drum 212 is rotated in a first direction (e.g., counterclockwise, clockwise, etc.), and drive the mixture out through the chute 218 when the mixing drum 212 is rotated in a second direction (e.g., clockwise, counterclockwise, etc.). In some embodiments, the chute 218 may also include an actuator positioned such that the chute 218 may be selectively pivotable to position the chute 218 (e.g., vertically, laterally, etc.), for example at an angle at which the mixture is expelled from the mixing drum 212.

Figure 7:
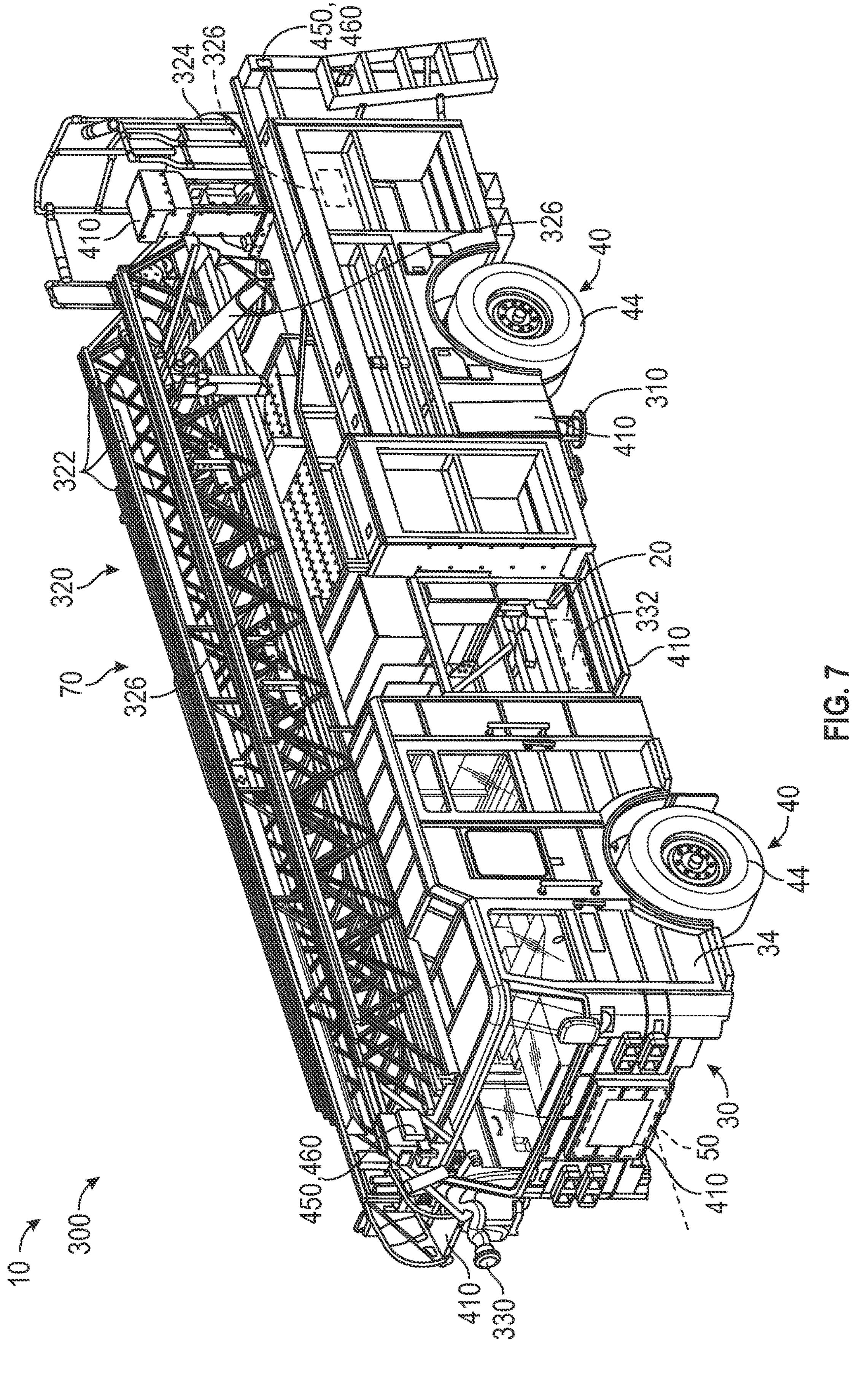
FIG. 7 is a front, right perspective view of the vehicle of FIG. 1 configured as a fire fighting vehicle, according to an exemplary embodiment.

Referring now to FIG. 7, the vehicle 10 is configured as a fire fighting vehicle or fire apparatus (e.g., a turntable ladder truck, a pumper truck, a quint, etc.), shown as fire fighting vehicle 300. In the embodiment shown in FIG. 7, the fire fighting vehicle 300 is configured as a rear-mount aerial ladder truck. In other embodiments, the fire fighting vehicle 300 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 7, in the fire fighting vehicle 300, the body assembly 70 is positioned mainly rearward from the cab 30. The body assembly 70 includes deployable stabilizers (e.g., outriggers, downriggers, etc.), shown as outriggers 310, that are coupled to the chassis 20. The outriggers 310 may be configured to selectively extend from each lateral side and/or the rear of the fire fighting vehicle 300 and engage a support surface (e.g., the ground) in order to provide increased stability while the fire fighting vehicle 300 is stationary. This increased stability is desirable when the ladder assembly 320 is in use (e.g., extended from the fire fighting vehicle 300) to prevent tipping. In some embodiments, the body assembly 70 further includes various storage compartments (e.g., cabinets, lockers, etc.) that may be selectively opened and/or accessed for storage and/or component inspection, maintenance, and/or replacement.

As shown in FIG. 7, the body assembly 70 includes a ladder assembly 320 coupled to the chassis 20. The ladder assembly 320 includes a series of ladder sections 322 that are slidably coupled with one another such that the ladder sections 322 may extend and/or retract (e.g., telescope) relative to one another to selectively vary a length of the ladder assembly 320. A base platform, shown as turntable 324, is rotatably coupled to the chassis 20 and to a proximal end of a base ladder section 322 (i.e., the most proximal of the ladder sections 322). The turntable 324 may be configured to rotate about a vertical axis relative to the chassis 20 to rotate the ladder sections 322 about the vertical axis (e.g., up to 360 degrees, etc.). The ladder sections 322 may rotate relative to the turntable 324 about a substantially horizontal axis to selectively raise and lower the ladder sections 322 relative to the chassis 20. The ladder assembly 320 may include various actuators (e.g., linear actuators), shown as ladder actuators 326, that control extension/retraction of the ladder sections 322, raising/lowering of the ladder sections 322 relative to the turntable 324, and/or rotation of the turntable 324 about the vertical axis.

As shown, a water turret or implement, shown as monitor 330, is coupled to a distal end of a fly ladder section 322 (i.e., the most distal of the ladder sections 322). The monitor 330 may be configured to expel water and/or a fire suppressing agent (e.g., foam, etc.) from a water storage tank and/or an agent tank onboard the fire fighting vehicle 300, and/or from an external source (e.g., a fire hydrant, a separate water/pumper truck, etc.). As shown, the vehicle 10 includes an actuator, shown as pump 332, that pressurizes the water and/or fire suppressing agent for expulsion from the monitor 330. In some embodiments, the ladder assembly 320 further includes an aerial platform coupled to the distal end of the fly ladder section 322 and configured to support one or more operators.

Control System

Figure 8:
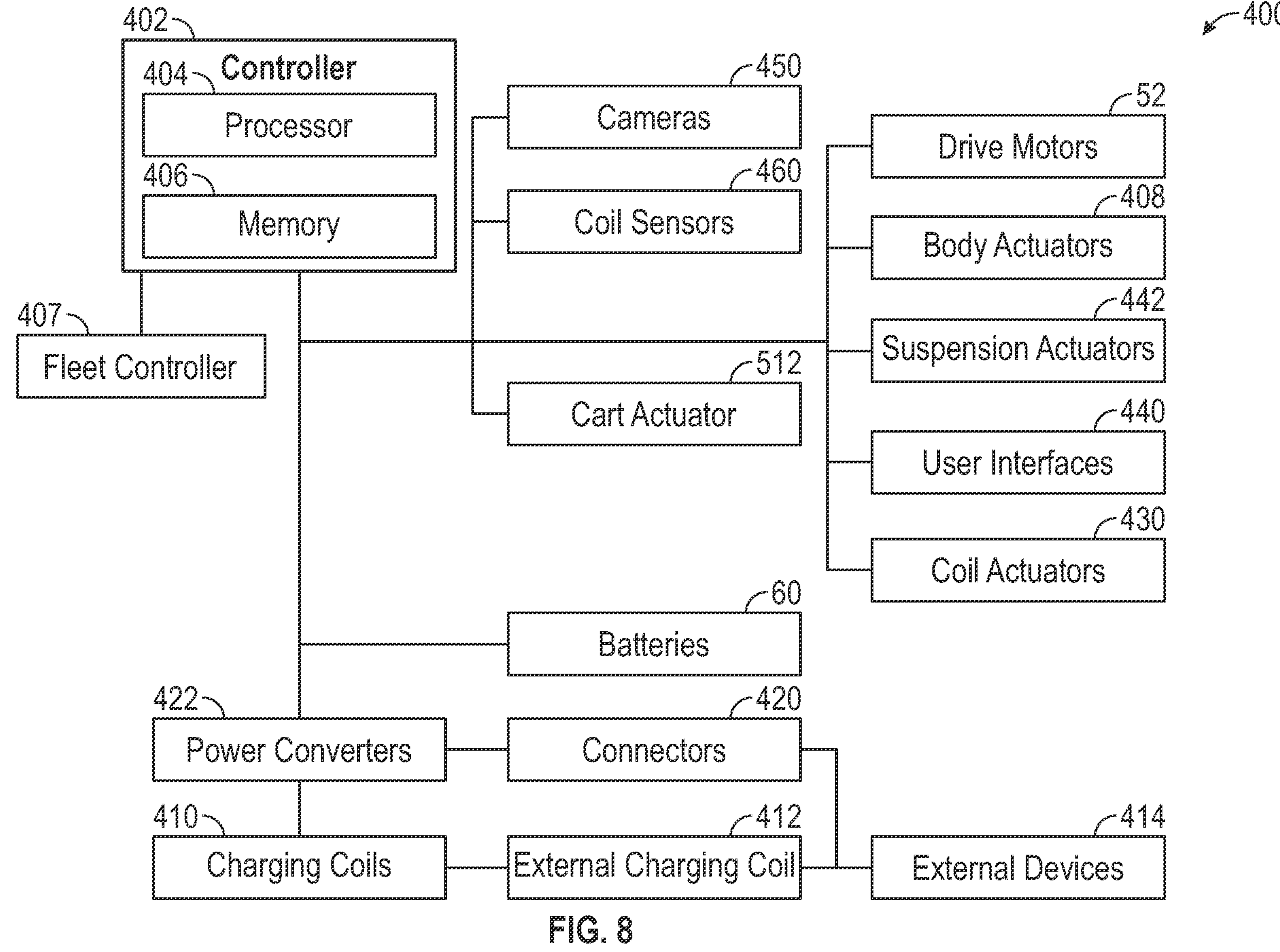
FIG. 8 is a block diagram of a control system of the vehicle of FIG. 1, according to an exemplary embodiment.

Referring to FIG. 8, a control system 400 of the vehicle 10 (and the various configurations of the vehicle 10 in the form of vehicle 100, 200, 300) is shown according to an exemplary embodiment. FIG. 8 illustrates an exemplary arrangement of the connections between the components of the vehicle 10. These connections may represent the transfer of power (e.g., electrical energy), data (e.g., control signals, sensor data, etc.), and/or other types of connections. Although one arrangement is shown, the components of the vehicle 10 may be otherwise connected. By way of example, components may be connected directly or indirectly to one another, additional connections may be made, or connections that are shown may be removed.

The control system 400 includes a control circuit or processing circuit, shown as controller 402. The controller 402 may control one or more systems of the vehicle 10 to perform the functions described herein. The controller 402 includes a processor 404 and a memory device, shown as memory 406. The memory 406 may store one or more instructions that, when executed by the processor 404, cause the processor 404 to perform the functions described herein.

In some embodiments, the controller 402 is configured to control a single vehicle 10. In embodiments where multiple vehicles 10 are operated (e.g., as a vehicle fleet), a secondary controller (e.g., a fleet management system), shown as fleet controller 407, may be configured to communicate with the controllers 402 of each of the vehicles 10. The fleet controller 407 may organize or otherwise control operation of the vehicles 10 such that the vehicles 10 operate in concert with one other. By way of example, the fleet controller 407 may determine routes for each of the vehicles 10 to ensure that all of the desired tasks (e.g., refuse pickups, concrete drop-offs, fire suppressions, etc.) are completed in a particular manner.

The fleet controller 407 may include one or more processors and memories (e.g., similar to the processor 404 and the memory 406). The fleet controller 407 may be operatively coupled (e.g., wirelessly) to the controllers 402 of multiple vehicles 10 of a vehicle fleet (e.g., as part of a telematics system). The fleet controller 407 may receive information (e.g., sensor data, route completion data, etc.) from the controller 402. The fleet controller 407 may provide information (e.g., commands, sensor data, route data, etc.) to the controllers 402. By way of example, the fleet controller 407 may provide commands that are executed directly by a controller 402 (e.g., to autonomously operate the vehicle 10). By way of another example, the fleet controller 407 may provide commands to a user (e.g., through the user interface 440), which the user then manually controls the vehicle 10 to complete. In some embodiments, the fleet controller 407 is a standalone controller. In other embodiments, the fleet controller 407 is a distributed controller. By way of example, the fleet controller 407 may be a virtual controller that is distributed across the controllers 402 of multiple vehicles 10.

For simplicity of illustration, the various actuators of the vehicle 10 described herein are illustrated as body actuators 408. By way of example, the body actuators 408 may include the tailgate actuator 122, the lift arm actuators 134, the articulation actuators 140, the finger actuators 166, the grabber extension actuator 174, the grabber lift actuator 176, the drum drive system 214, the chute actuator 220, the outriggers 310, the ladder actuators 326, the pump 332, and/or other actuators of the vehicle 10. The body actuators 408 may be or include one or more electric actuators. By way of example, the body actuators 408 may include electric linear actuators, such as a ball-screw actuator driven by an electric motor. By way of example, the body actuators 408 may include one or more rotary electric actuators, such as electric motors.

With continued reference to FIG. 8, in some embodiments, the vehicle 10 includes one or more wireless charging interfaces (e.g., wireless charging pads, wireless charging panels, coil plates, etc.), shown as charging coils 410. The charging coils 410 communicate with one or more external charging coils 412 positioned outside of the vehicle 10. The external charging coils 412 are electrically coupled to one or more electrical energy receivers or electrical energy sources, shown as external devices 414. The charging coils 410 and the external charging coils 412 transfer electrical energy between the vehicle 10 and the external devices 414. The charging coils 410 and the external charging coils 412 may transfer electrical energy from the external devices 414 to the vehicle 10 (e.g., to charge the batteries 50, to power one or more functions of the vehicle 10, etc.). The charging coils 410 and the external charging coils 412 may transfer electrical energy from the vehicle 10 to the external devices 414 (e.g., to power the external device 414). The charging coils 410 and the external charging coils 412 may communicate energy through induction. It should be appreciated that the lines drawn between the charging coils 410 and the external charging coils 412 throughout the figures represent energy transfer (e.g., induction) between the two components and are not indicative of a physical or structural connection/coupling. By way of example, the vehicle 10 may supply an alternating current to the charging coils 410, the charging coils 410 may in turn generate a magnetic flux, and the external charging coils 412 may convert the magnetic flux back to electrical energy. By way of another example, the external device 414 may supply an alternating current to the external charging coils 412, the external charging coils 412 may in turn generate a magnetic flux, and the charging coils 410 may convert the magnetic flux back to electrical energy.

Referring to FIG. 8, the vehicle 10 includes an electrical connector, shown as connector 420. The connector 420 is configured to establish a wired electrical connection to an external device 414. The connector 420 may be selectively coupled to a cable or wire that connects the vehicle 10 to the external device 414. The connector 420 may transfer alternating current or direct current electrical between the vehicle 10 and the external device 414.

Electrical energy entering, leaving, or otherwise passing through the vehicle 10 may be conditioned by one or more power conditioners (e.g., inverters, rectifiers, transformers, etc.), shown as power converters 422. The power converters 422 may condition power (e.g., change the frequency, current, voltage, whether the power is alternating current (AC) or direct current (DC), etc.) from the batteries 50, the connectors 420, the charging coils 410, or other devices for use within the vehicle 10 or to be transferred outside of the vehicle 10.

The power converters 422 may convert electrical energy from AC to DC (e.g., the power converters 422 may include a rectifier). By way of example, the power converters 422 may convert AC electrical energy from the connectors 420 or the charging coils 410 to DC electrical energy to charge the batteries 50 or to power the controller 402 or other systems of the vehicle 10. The power converters 422 may convert electrical energy from DC to AC (e.g., the power converters 422 may include an inverter). By way of example, the power converters 422 may convert DC electrical energy from the batteries 50 to AC electrical energy to power the charging coils 410 and/or the connectors 420.

In operation, electrical energy may enter the vehicle 10 from one or more external devices 414 through one or more connectors 420 and/or through one or more charging coils 410. The electrical energy may be conditioned by the power converters 422 and distributed to the devices of the vehicle 10 (e.g., the controller 402, the drive motors 52, the body actuators 408, the batteries 50, etc.). The electrical energy may be consumed by the devices (e.g., to power one or more of the body actuators 408 or the drive motors 52, etc.). Additionally or alternatively, the electrical energy may be stored (e.g., in the batteries 50). Stored energy from the batteries 50 may be conditioned by the power converters 422 and supplied to one or more external devices 414 (e.g., through one or more of the connectors 420 and/or one or more of the external charging coils 412). The controller 402 may control distribution of the electrical energy throughout this process.

In some embodiments, the vehicle 10 includes one or more actuators (e.g., electric motors, electric linear actuators, etc.), shown as coil actuators 430, operatively coupled to the controller 402. The coil actuators 430 may be configured to move the charging coils 410 relative to another component of the vehicle 10 (e.g., relative to the chassis 20, the cab 30, and/or the body assembly 70). The coil actuators 430 may facilitate moving the charging coils 410 into position to communicate with one or more external charging coils 412. By way of example, a coil actuator 430 may move a charging coil 410 into alignment with one of the external charging coils 412 (e.g., such that the charging coil 410 is centered relative to the external charging coil 412). By way of another example, a coil actuator 430 may move a charging coil 410 to vary a distance between the charging coil 410 and an external charging coil 412 (e.g., reducing the distance). Accordingly, the coil actuators 430 may improve the effectiveness (e.g., efficiency, rate, etc.) of the power transfer between the charging coils 410 and the external charging coils 412.

In some embodiments, the vehicle 10 includes an active suspension including one or more actuators, shown as suspension actuators 442, operatively coupled to the controller 402. The suspension actuators 442 may control a ride height of the vehicle 10 (e.g., a distance between the chassis 20 and the ground). By way of example, a suspension actuator 442 may include a gas spring that controls a distance between a wheel and tire assembly 44 and the chassis 20. In such an embodiment, the suspension actuator 442 may include a supply of gas (e.g., a pressurized tank, a compressor, etc.) that supplies gas to the gas spring to increase the ride height and/or a valve that releases gas from the gas spring to decrease the ride height.

In some embodiments, the control system 400 includes one or more input devices and/or output devices, shown as user interfaces 440. The user interfaces 440 may include one or more input devices configured to receive inputs (e.g., commands) from a user. By way of example, the user interfaces 440 may include buttons, knobs, switches, dials, touchscreens, microphones, and/or other input devices. The user interfaces 440 may include one or more output devices configured to communicate information to a user. By way of example, the user interfaces 440 may include displays, lights, haptic feedback devices (e.g., vibrators), speakers, and/or other output devices.

In some embodiments, the control system 400 includes one or more sensors, shown as cameras 450, operatively coupled to the controller 402. The cameras 450 may capture image data (e.g., still images, video, etc.). The image data may be displayed to the user (e.g., by a display of a user interface 440). By way of example, the image data may be utilized as part of an advanced driver-assistance system (ADAS) that facilitates operation of the vehicle 10 by the user. The image data may be processed by the controller 402. By way of example, the image data may provide feedback to be used by the controller 402 when controlling one or more systems of the vehicle 10.

In some embodiments, the control system 400 includes one or more sensors, shown as coil sensors 460, operatively coupled to the controller 402. The coil sensors 460 may each be configured to measure a position and/or an angular orientation of one of the charging coils 410 relative to a point of reference on the vehicle 10 and/or outside of the vehicle 10. The coil sensor 460 may include a distance sensor (e.g., an ultrasonic distance sensor, an infrared distance sensor, a laser distance sensor, a linear variable differential transformer, a linear potentiometer, etc.). By way of example, the coil sensor 460 may measure movement of a charging coil 410 relative to the chassis 20. By way of another example, the coil sensor 460 may measure a distance between a charging coil 410 and an external charging coil 412. The coil sensor 460 may include an angle sensor (e.g., a gyroscope, an encoder, a potentiometer, etc.). By way of example, the coil sensor 460 may measure an orientation of a charging coil 410 relative to the chassis 20.

Charger Arrangement

Referring to FIG. 1, the charging coils 410 may have a variety of different positions on the vehicle 10. As shown, the vehicle 10 includes charging coils 410 positioned along the front side 80, the rear side 82, the top side 84, the bottom side 86, the left side 88, and the right side 90 of the vehicle 10. The charging coils 410 may be coupled to the chassis 20, the cab 30, and/or the body assembly 70.

In order to effectively transfer power (e.g., maximize the rate of transfer, minimize the energy losses of the transfer) between a charging coil 410 and an external charging coil 412, it may be desirable to control (a) the distance between the charging coil 410 and the external charging coil 412 and (b) the alignment of the charging coil 410 with the external charging coil 412, thereby placing the charging coil 410 in a desired position or range of positions. By way of example, it may be advantageous to minimize the distance between the charging coil 410 and the external charging coil 412. By way of another example, it may be advantageous to align (e.g., center) the charging coil 410 with the external charging coil (e.g., to place the charging coil 410 in a desired orientation).

Figures 9, 10:
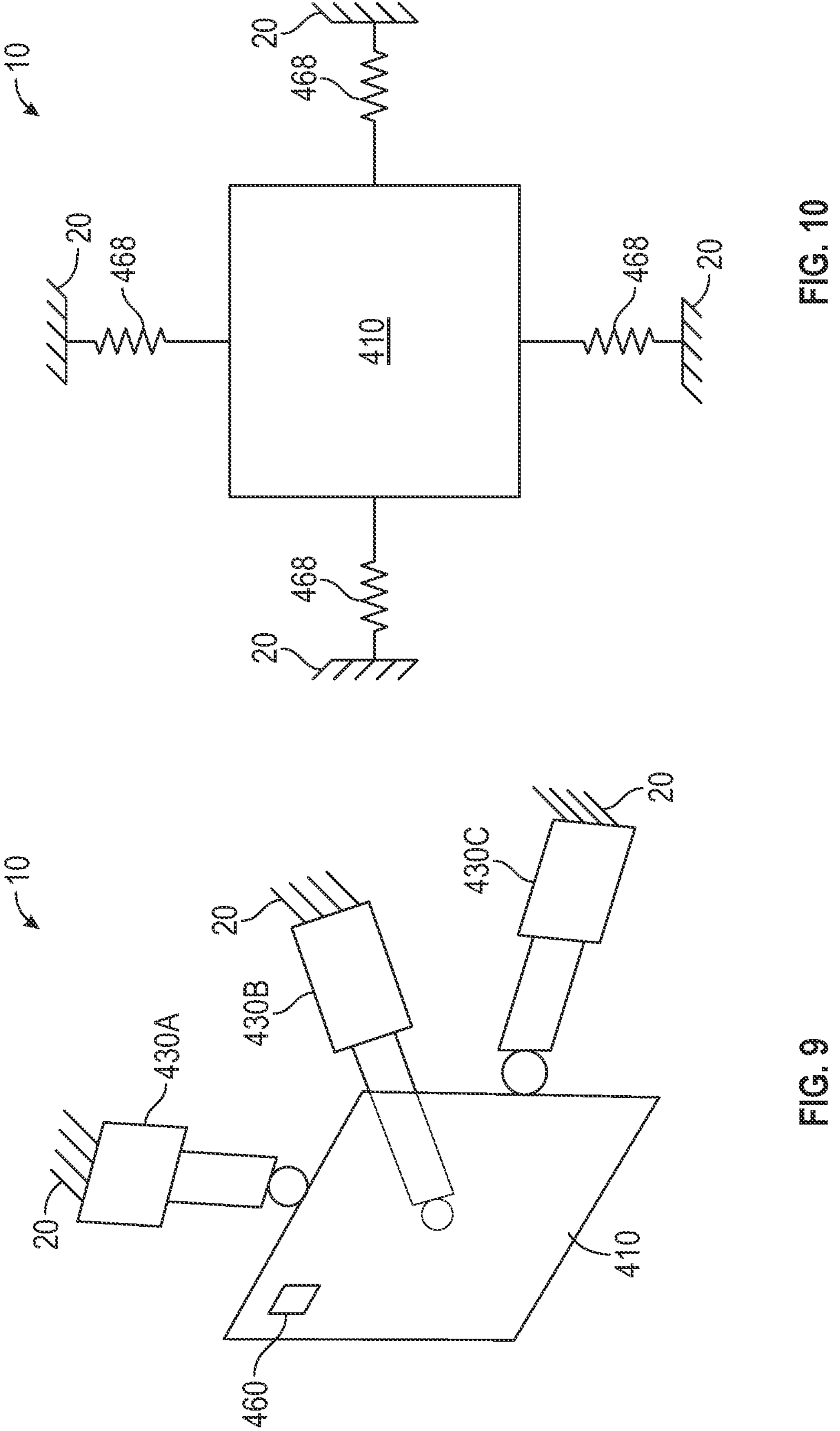
FIG. 9 is a schematic diagram illustrating a charging coil of the vehicle of FIG. 1, according to an exemplary embodiment.
FIG. 10 is a schematic diagram illustrating a charging coil of the vehicle of FIG. 1, according to another exemplary embodiment.

To facilitate placing a charging coil 410 in a desired position, the charging coils 410 may be repositionable relative to the chassis 20 of the vehicle 10. The charging coils 410 may be actively or passively positioned. FIG. 9 illustrates a configuration in which a charging coil 410 is actively positioned. As shown, the charging coil 410 is coupled to the chassis 20 by a series of coil actuators 430. Specifically, a first coil actuator 430A controls the vertical position of the charging coil 410. A second coil actuator 430B controls the lateral position of the charging coil 410. A third coil actuator 430C controls the longitudinal position of the charging coil 410. Accordingly, the position of the charging coil 410 relative to the chassis 20 may be adjusted in any direction. In other words, the charging coil 410 may be adjusted along three axes. The first coil actuator 430A may selectively adjust a position of the charging coil 410 along a first axis, the second coil actuator 430B may selectively adjust a position of the charging coil 410 along a second axis that is perpendicular to the first axis, and the third coil actuator 430C may selectively adjust a position of the charging coil 410 along a third axis that is perpendicular to a plane that intersects both the first axis and the second axis. In some embodiments, one or more of the coil sensors 460 are coupled to the charging coil 410 to facilitate determining when the charging coil 410 has reached the desired position.

FIG. 10 illustrates a configuration in which a charging coil 410 is passively positioned. As shown, the charging coil 410 is movably coupled to the chassis 20 by a series of biasing members, shown as springs 468. The springs 468 are each positioned to apply a biasing force against the charging coil 410 in a different direction. The balance of these biasing forces holds the charging coil 410 in a generally centered position, but permits movement of the charging coil 410 when an external force is applied. In some embodiments, the springs 468 permit an external device (e.g., the charging station 470) to reposition the charging coil 410. In some embodiments, operation of the charging coil 410 and/or the external charging coil 412 produces a magnetic flux. This magnetic flux causes the charging coil 410 and/or the external charging coil 412 to act as an electromagnet, forcing the charging coil 410 into alignment with the external charging coil 412.

The external charging coils 412 and the external devices 414 may be integrated into one or more stationary charging stations. In such a configuration, the external device 414 may be an external power source, such as a battery bank, a generator, or a connection to a power grid. The vehicle 10 may approach the charging station to bring a charging coil 410 in proximity to the external charging coil 412, and the external device 414 may supply electrical energy to the vehicle 10 through the external charging coil 412 and the charging coil 410. The external charging coil 412 may be positioned to face upward to communicate electrical energy to a charging coil 410 positioned along the bottom side 86 of the vehicle 10. The external charging coil 412 may positioned to face horizontally (e.g., perpendicular to a ground on which the vehicle 10 travels) to communicate electrical energy to a charging coil 410 positioned along the front side 80, the rear side 82, the left side 88, or the right side 90 of the vehicle 10. The external charging coil 412 may positioned to face downward to communicate electrical energy to a charging coil 410 positioned along the top side 84 of the vehicle 10.

Figure 11:
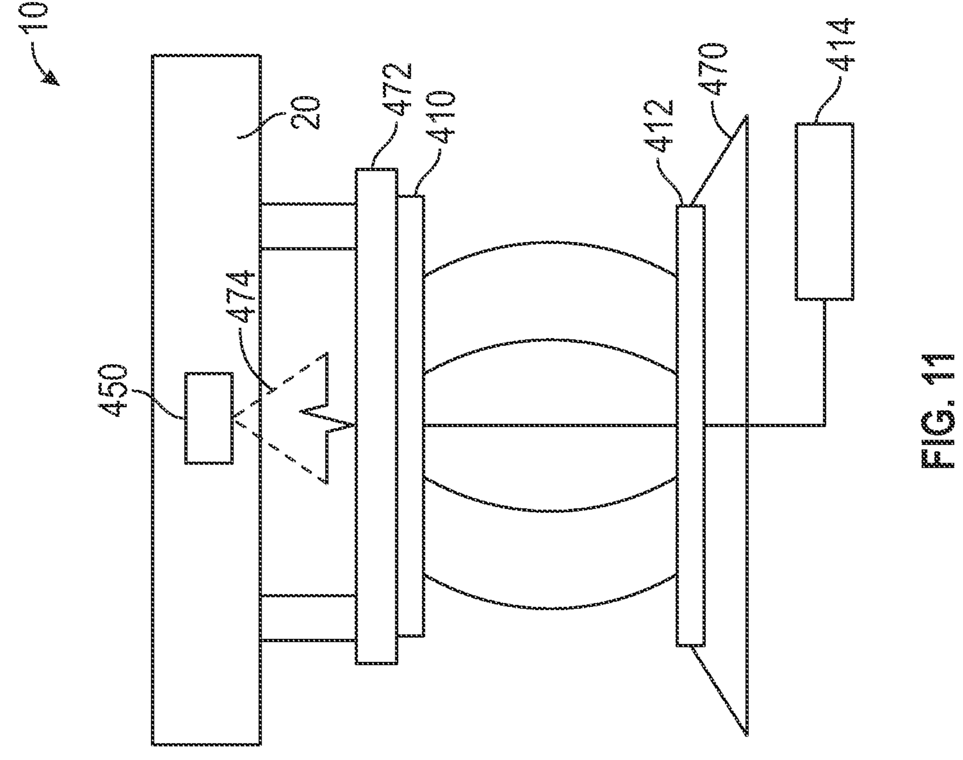
FIG. 11 is a side view of a charging coil of the vehicle of FIG. 1 interacting with an external charging coil, according to an exemplary embodiment.

Referring to FIG. 11, the vehicle 10 is shown interacting with a stationary charging station, shown as charging station 470, according to an exemplary embodiment. In this embodiment, the charging station 470 is positioned a distance away from the vehicle 10. By way of example, the charging station 470 may be positioned below the vehicle 10. In other embodiments, the charging station 470 may be positioned elsewhere, such as in front of, rearward of, to the left or right of, or above the vehicle 10. In the embodiment of FIG. 11, the charging coil 410 is fixedly coupled to the chassis 20. Specifically, the charging coil 410 is fixedly coupled to the chassis 20 by an intermediate member, shown as standoff 472. By way of example, the standoff 472 may be a skidplate or underbody protector that is configured to protect one or more underbody components from damage caused by contact with debris or a portion the ground.

The vehicle 10 includes a camera 450 that has a field of view 474. Although only a portion of the field of view 474 is shown, it should be understood that the field of view 474 may extend to include any area relative to the vehicle 10. The camera 450 may be situated such that the field of view 474 includes an area occupied by the charging station 470 when the external charging coil 412 is aligned with the charging coil 410. The camera 450 may be used to align the charging coil 410 with the external charging coil 412. By way of example, the controller 402 may control the user interface 440 to display the image data from the camera 450. The user may utilize the displayed image to determine how to drive the vehicle 10 (e.g., how to control the drive motors 52) to align the charging coil 410 with the external charging coil 412. By way of another example, the controller 402 may analyze the image data from the camera 450 to determine how to drive the vehicle 10 to align the charging coil 410 with the external charging coil 412. The controller 402 may autonomously drive the vehicle 10 to move the charging coil 410 into alignment with the external charging coil 412. Alternatively, the controller 402 may provide instructions to the driver (e.g., through the user interface 440) regarding how to drive the vehicle to move the charging coil 410 into alignment with the external charging coil 412.

Figure 12:
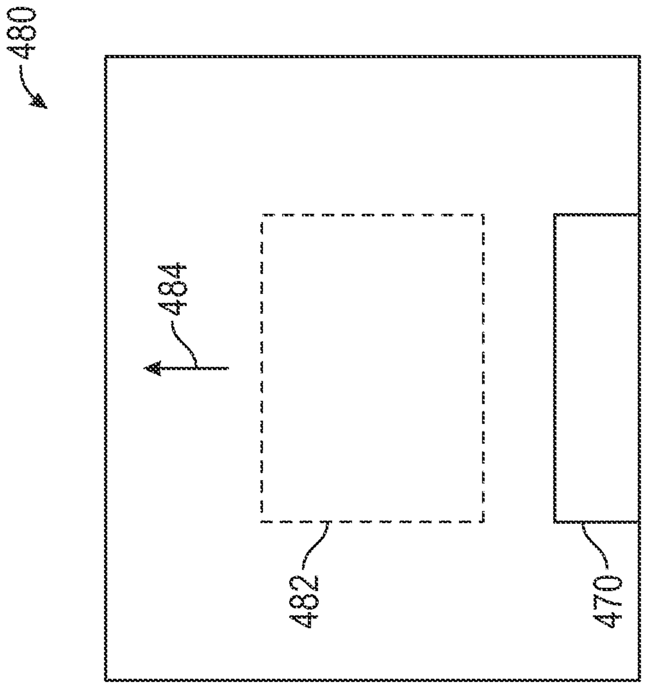
FIG. 12 is a screenshot of a graphical user interface (GUI) that facilitates alignment of a charging coil, according to an exemplary embodiment.

FIG. 12 illustrates a graphical user interface (GUI) 480 displayed by the user interface 440 to facilitate alignment of the charging coil 410 with the external charging coil 412. The GUI 480 displays the image data of the camera 450 along with an overlay. As shown, the GUI 480 displays the current position of the charging station 470. The GUI 480 further displays a target area 482, which represents a desired range of locations of the charging station 470 relative to the vehicle 10. The desired range may represent locations in which energy transfer between the charging coil 410 and the external charging coil 412 is maximized (e.g., in which the charging coil 410 is near or in alignment with the external charging coil 412). The controller 402 determines how the vehicle 10 should be driven to bring the charging station 470 into the target area 482. The GUI 480 displays an instruction 484 that represents a suggested action that would cause the vehicle 10 to bring the charging station 470 into the target area.

Alternatively, instead of the GUI 480 being presented on a screen, the information within the GUI 480 may be projected onto the ground nearby the vehicle 10. By way of example, the user interface 440 may include one or more projectors facing outward from the vehicle. The projectors may project an image on the ground indicating how the vehicle 10 should be driven to align the charging coil 410 with the charging station 470. By way of example, the projected image may include the target area 482 and/or the instruction 484.

Figure 13:
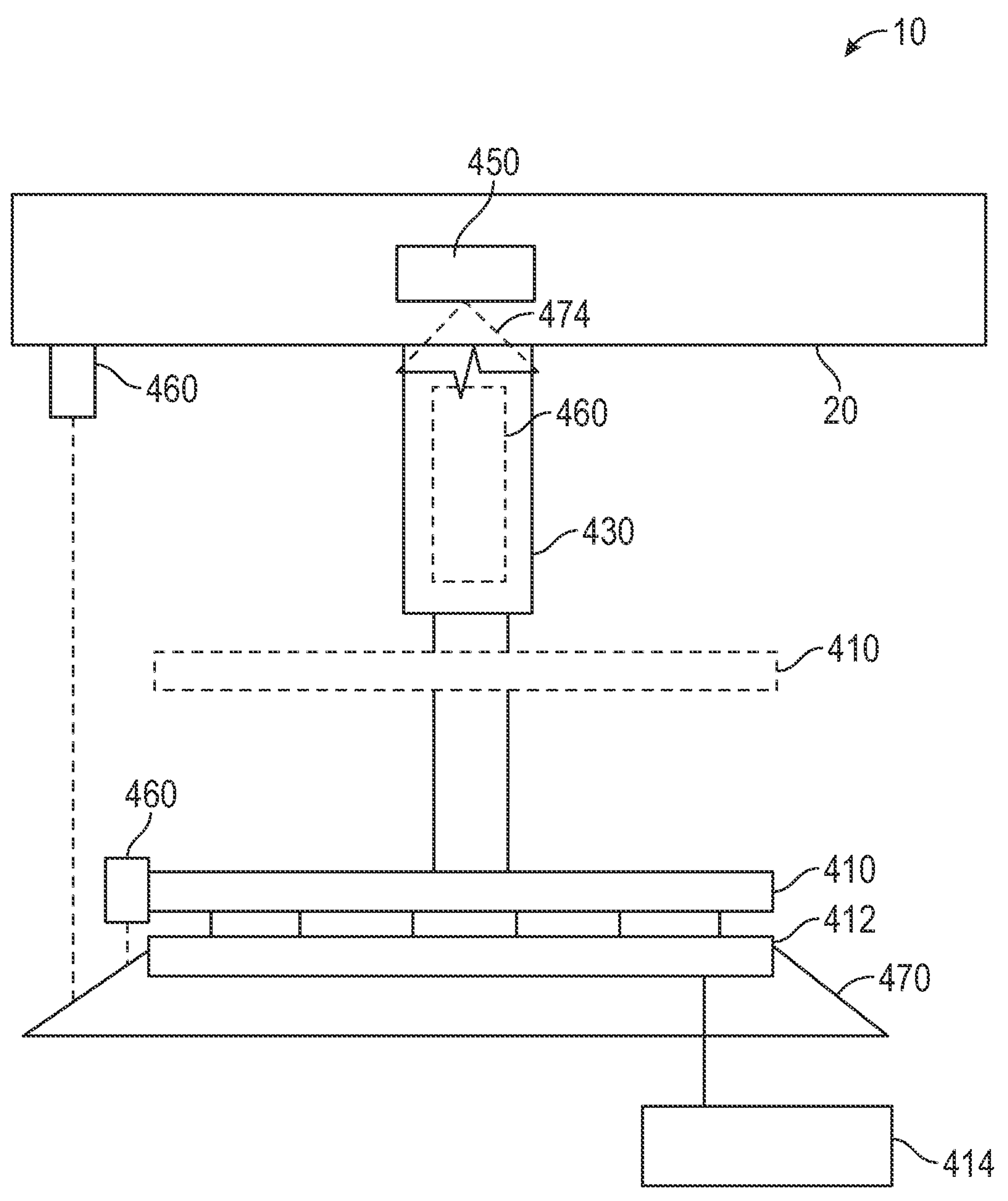
FIG. 13 is a side view of a charging coil of the vehicle of FIG. 1 interacting with an external charging coil, according to another exemplary embodiment.

Referring to FIG. 13, the vehicle 10 is shown interacting with the charging station 470 according to an alternative embodiment. This embodiment may be substantially similar to the embodiment of FIG. 11, except as illustrated in the figures or as otherwise specified. In this embodiment, the charging coil 410 is coupled to the chassis 20 by a coil actuator 430. The coil actuator 430 is configured to move the charging coil 410 relative to the chassis 20 to vary a distance between the charging coil 410 and the charging station 470. The coil actuator 430 may vary the distance between the charging coil 410 and the external charging coil 412 to maximize the effectiveness of the power transfer between the charging coils 410 and the external charging coils 412 (e.g., with the charging coil 410 in a desired position). The dashed lines illustrate the charging coil 410 in a first position away from the charging station 470, and the solid lines illustrate the charging coil 410 in second, desired position closer to the charging station 470. Embodiments where the coil actuator 430 moves the charging coil 410 vertically may be useful in applications that require large amounts of ground clearance. By way of example, the coil actuator 430 may raise the charging coil 410 when not in use to avoid the charging coil 410 contacting an obstruction on the ground. Vertically-adjusting coil actuators 430 may also facilitate compensating for variance in tire size.

Referring still to FIG. 13, one or more coil sensors 460 may be utilized to bring the charging coil 410 into the desired position. A first coil sensor 460 is coupled to the chassis 20 and configured to provide a first signal indicating a distance between the chassis 20 and the charging station 470. A second coil sensor 460 is coupled to the coil actuator 430 and configured to provide a second signal indicating a distance between the chassis 20 and the charging coil 410. A third coil sensor 460 is coupled to the charging coil 410 and configured to provide a third signal indicating a distance between the charging coil 410 and the charging station 470. The controller 402 may use the first signal and the second signal to determine a distance between the charging coil 410 and the charging station 470. Alternatively, the controller 402 may use the third signal to determine the distance between the charging coil 410 and the charging station 470 directly.

Figure 14:
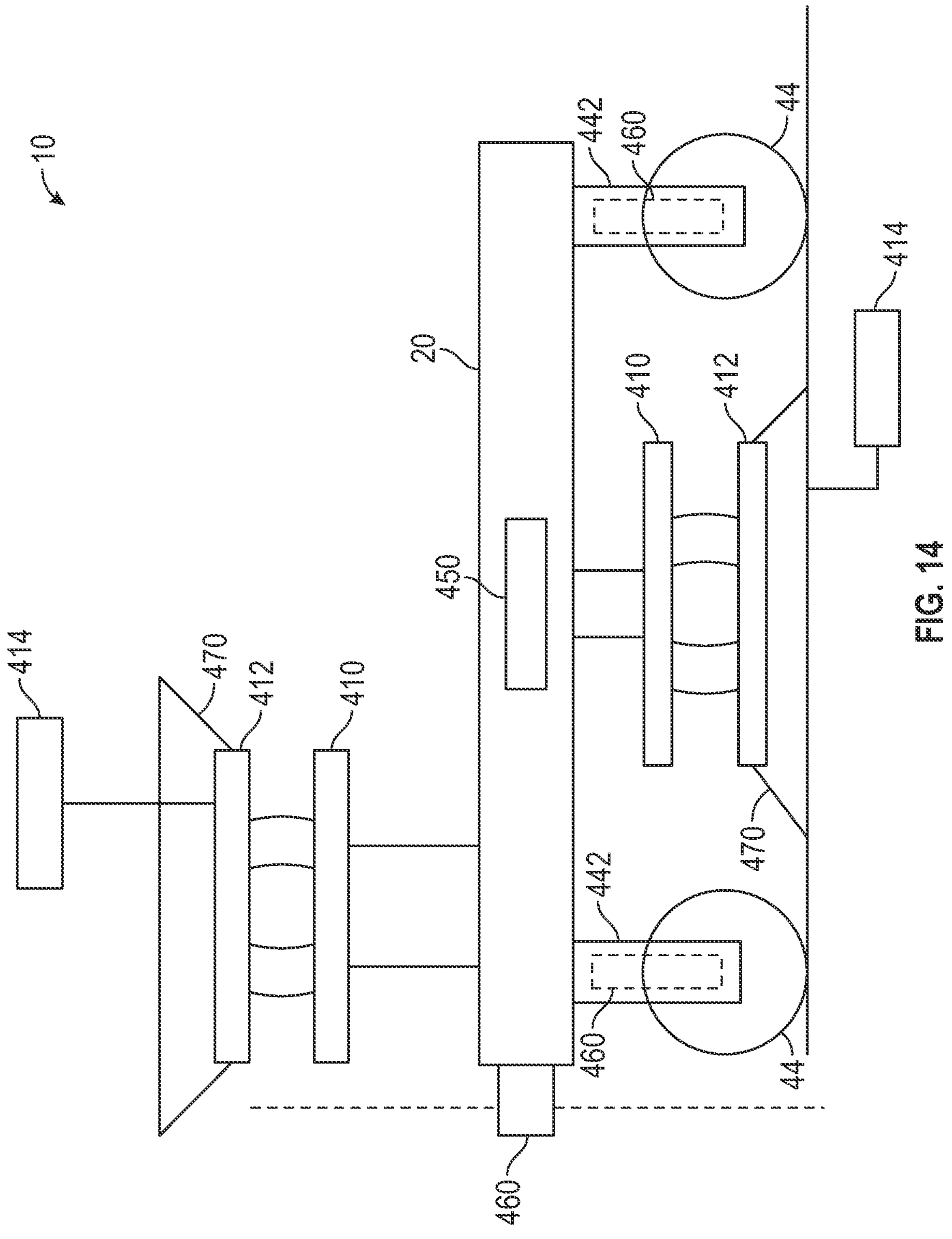
FIG. 14 is a side view of a charging coil of the vehicle of FIG. 1 interacting with an external charging coil, according to another exemplary embodiment.

Referring to FIG. 14, the vehicle 10 is shown interacting with the charging station 470 according to an alternative embodiment. This embodiment may be substantially similar to the embodiment of FIG. 13, except as illustrated in the figures or as otherwise specified. In this embodiment, the vehicle 10 includes a charging coil 410 that is positioned to communicate with a charging station 470 above the vehicle 10 and a charging coil 410 that is positioned to communicate with a charging station 470 below the vehicle 10. The charging station 470 above the vehicle 10 may be freely suspended or sprung downward by a biasing element. In such a configuration, the force of the biasing element and/or gravity biases the charging station 470 toward the vehicle 10 while accommodating variations in vehicle height.

The vehicle 10 further includes the suspension actuators 442 that couple the wheel and tire assemblies 44 to the chassis 20. Each suspension actuator 442 is configured to control a distance between one or more of the wheel and tire assemblies 44 and the chassis 20. Accordingly, the suspension actuators 442 control the distance between the chassis 20 and a ground (e.g., the ride height of the vehicle 10) on which the vehicle 10 travels. The suspension actuators 442 may raise the chassis 20 to bring a charging coil 410 toward the charging station 470 above the vehicle 10 and to bring a charging coil 410 away from the charging station 470 below the vehicle 10. The suspension actuators 442 may lower the chassis 20 to bring a charging coil 410 away from the charging station 470 above the vehicle 10 and to bring a charging coil 410 toward the charging station 470 below the vehicle 10. The suspension actuators 442 may raise the charging coil 410 to increase the ground clearance of the vehicle 10. The suspension actuators 442 may also facilitate compensating for changes in tire size of the wheel and tire assemblies 44.

The vehicle 10 further includes coil sensors 460 that provide signals indicating an extension length of each suspension actuator 442. Accordingly, the coil sensors 460 indicate a ride height of the vehicle 10. Another coil sensor 460 provides a signal indicating a distance between the chassis 20 and objects above and below the vehicle 10 (e.g., the external charging pads 412). The controller 402 may use the signals from the coil sensors 460 to control the distances between the charging coils 410 and the external charging coils 412.

Figure 15:
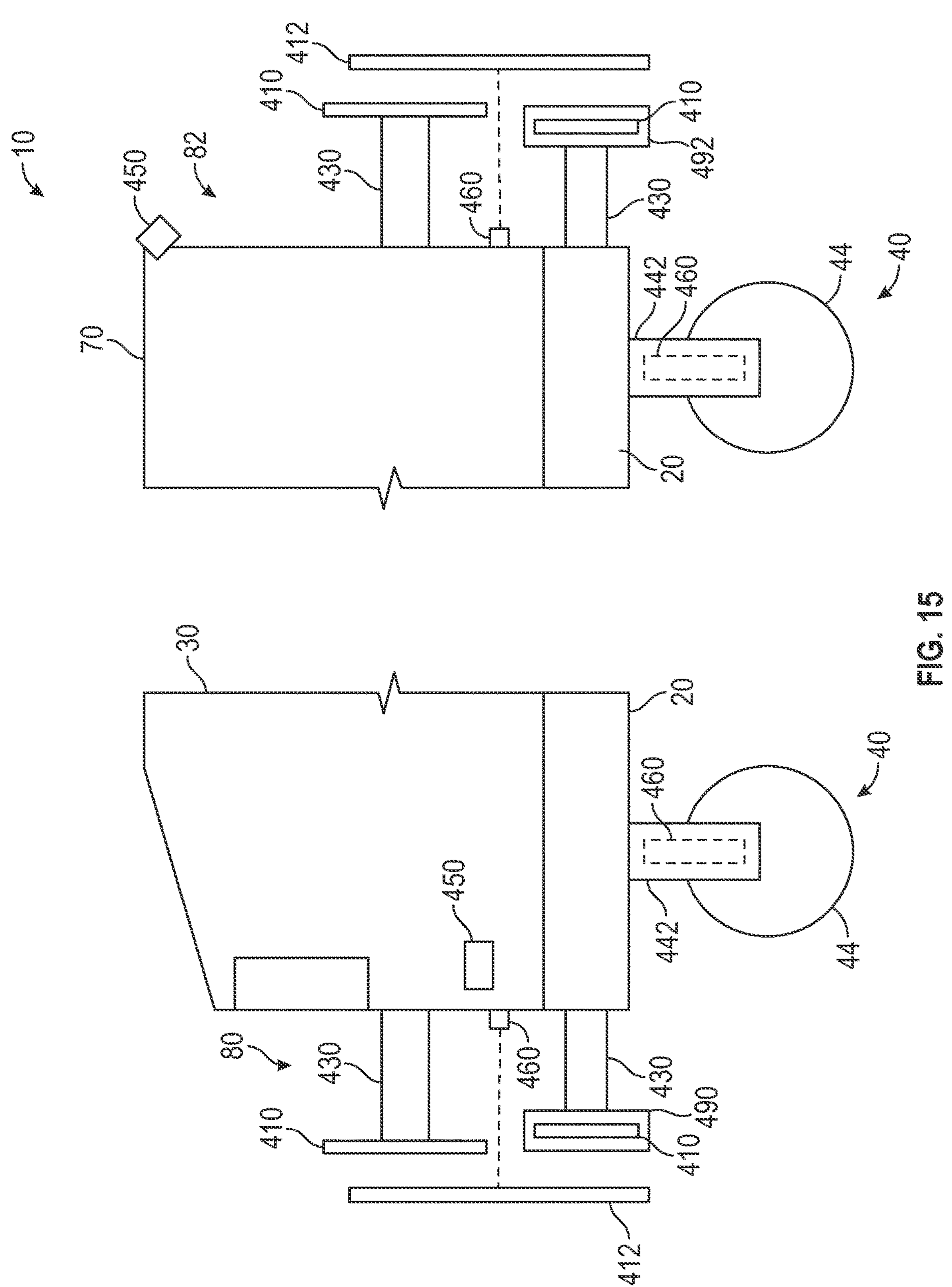
FIG. 15 is a side view of the vehicle of FIG. 1 interacting with external charging coils, according to an exemplary embodiment.

FIG. 15 illustrates a configuration with charging coils 410 positioned along the front side 80 and the rear side 82 of the vehicle 10. A coil sensor 460 and a camera 450 are positioned on the front side 80 and the rear side 82 to facilitate locating the vehicle 10 and the charging coils 410 relative to external charging coils 412. As shown, a charging coil 410 is coupled to the cab 30 by a coil actuator 430 along the front side 80, and the coil actuator 430 moves the charging coil 410 longitudinally relative to the cab 30 (e.g., perpendicularly outwardly from the front side 80, or along a travel direction of the vehicle 10). Another charging coil 410 is coupled to the chassis 20 by a coil actuator 430. Specifically, this charging coil 410 is integrated into (e.g., coupled to and positioned within a recess of) a guard or bumper, shown as front bumper 490. The front bumper 490 is coupled to the chassis 20 by a coil actuator 430, and the coil actuator 430 moves the charging coil 410 and the front bumper 490 relative to the chassis 20. Another charging coil 410 is coupled to the body assembly 70 by a coil actuator 430 along the rear side 82, and the coil actuator 430 moves the charging coil 410 longitudinally relative to the body assembly 70 (e.g., perpendicularly outwardly from the rear side 82, or along a reverse direction of the vehicle 10). Another charging coil 410 is coupled to the chassis 20 by a coil actuator 430. Specifically this charging coil 410 is integrated into (e.g., coupled to and positioned within a recess of) a guard or bumper, shown as rear bumper 492. The rear bumper 492 is coupled to the chassis 20 by a coil actuator 430, and the coil actuator 430 moves the charging coil 410 and the rear bumper 492 relative to the chassis 20.

The front bumper 490 and the rear bumper 492 may each act as a cage or enclosure to protect the corresponding charging coil 410 from impacts with external objects. By way of example, the front bumper 490 may protect a charging coil 410 from a front impact with another vehicle. By way of example, the rear bumper 492 may protect a charging coil 410 from a rear impact with a stationary object, such as a tree or building. By situating charging coils 410 within the front bumper 490 and the rear bumper 492, the charging coils 410 may be positioned near the outer surface of the vehicle 10 (e.g., to minimize the distance between the charging coil 410 and the external charging coil 412 while charging) without exposing the charging coils 410 to impacts.

In operation, the charging coils 410 along the front side 80 may communicate with one or more external charging coils 412 positioned forward of the vehicle 10. The drive motors 52 may be controlled (e.g., manually by a user or autonomously by the controller 402) to move the vehicle 10 longitudinally along a travel path until the front side 80 of the vehicle 10 is near the external charging coil 412. Once the vehicle 10 is within a threshold distance of the external charging coil 412, the drive motors 52 and/or the coil actuators 430 may be used to move the charging coils 410 to within a desired distance of the external charging coil 412. In some embodiments, the coil actuators 430 provide a more precise adjustment (e.g., provide adjustment in finer increments) than the drive motors 52. Feedback from the coil sensors 460 and/or the cameras 450 may be utilized to facilitate this process.

In operation, the charging coils 410 along the rear side 82 may communicate with one or more external charging coils 412 positioned rearward of the vehicle 10. Similarly, the drive motors 52 and/or the coil actuators 430 may be used to move the charging coils 410 to within a desired distance of the external charging coil 412 positioned rearward of the vehicle 10. As adjustment of the position of the vehicle 10 using the drive motors 52 affects the positions of all of the charging coils 410, the coil actuators 430 may facilitate relative adjustment of the positions of the charging coils 410. By way of example, if a first charging coil 410 positioned along the front side 80 were in the desired position (e.g., positioned at a desired distance from the corresponding external charging coil 412), but a second charging coil 410 positioned along the rear side 82 were positioned too far from the corresponding external charging coil 412, adjustment of the position of the vehicle 10 using the drive motors 52 would move the first charging coil 410 outside of the desired position. Accordingly, a coil actuator 430 may move the second charging coil 410 into the desired position without disturbing the first charging coil 410.

In embodiments where charging coils 410 are positioned along the front side 80, the rear side 92, the left side 88, or the right side 90 of the vehicle 10, the suspension actuators 442 may be used to align the charging coils 410 with the corresponding external charging coils 412. By way of example, in the embodiment shown in FIG. 15, the suspension actuators 442 may adjust the ride height of the vehicle 10 to facilitate alignment of the charging coils 410 with the corresponding external charging coils 412. Feedback from the coil sensor 460 and/or the cameras 450 may be used throughout this process. In embodiments where the vehicle 10 has an independent suspension, the suspension actuators 442 may be used to adjust the positions of the charging coils 410 individually. By way of example, the suspension actuators 442 on the front axle 40 may be used to raise and/or lower the charging coils 410 along the front side 80, and the suspension actuators 442 on the rear axle 42 may be used to raise and/or lower the charging coils 412 along the rear side 82 (e.g., thereby adjusting the pitch of the vehicle 10). Such independent control may be useful when the external charging coils 412 are positioned at different heights and/or when the vehicle 10 is positioned on an inclined support surface (e.g., a hill or ramp). Similarly, the suspension actuators 442 along the left and right sides of the vehicle 10 may be adjusted individually (e.g., thereby adjusting the roll of the vehicle 10) to adjust the relative heights of charging coils 410 on the left side 88 and the right side 90.

Figure 16:
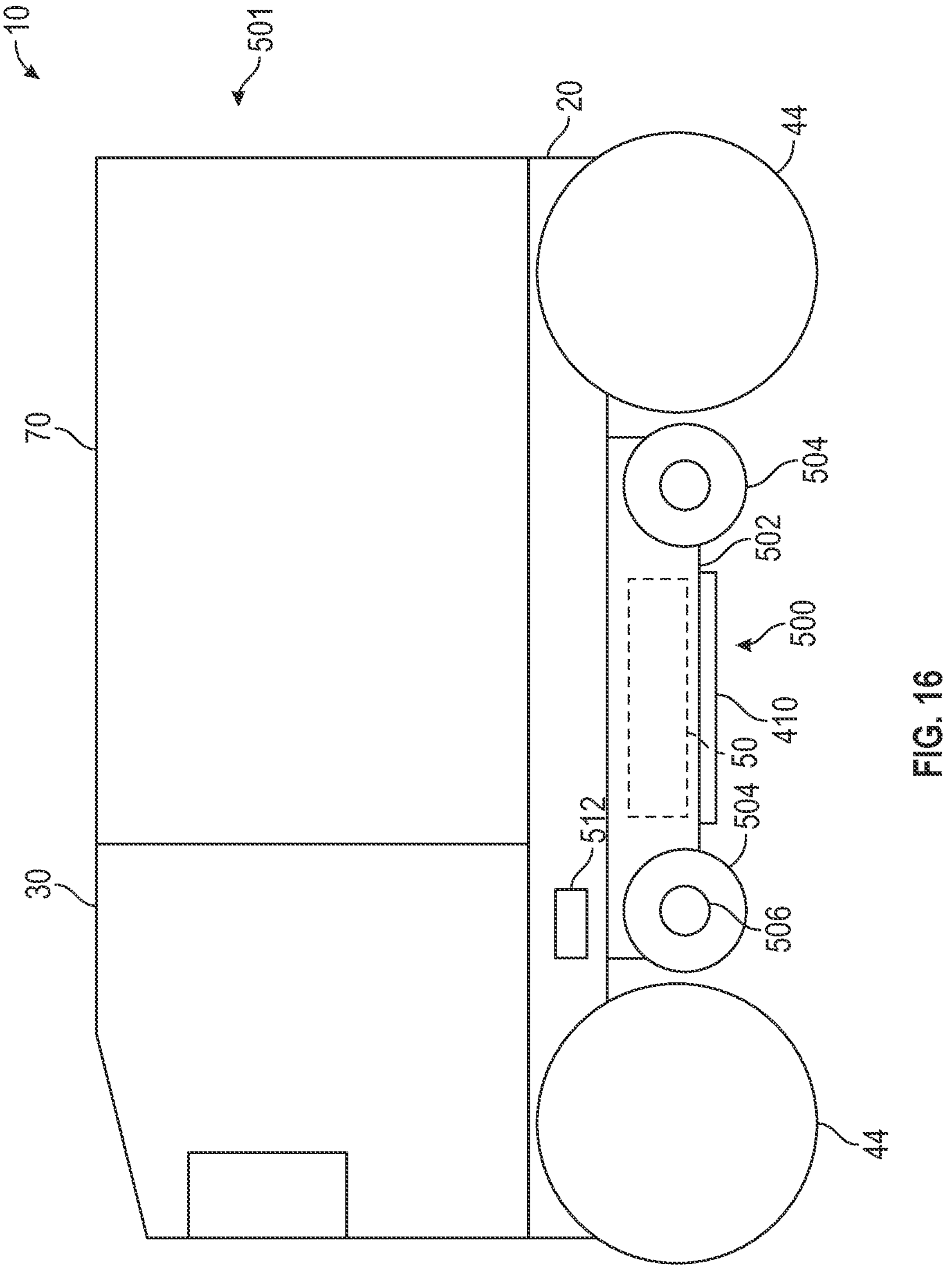
FIG. 16 is a side view of the vehicle of FIG. 1 including a charging cart in a stored configuration, according to an exemplary embodiment.
Figure 17:
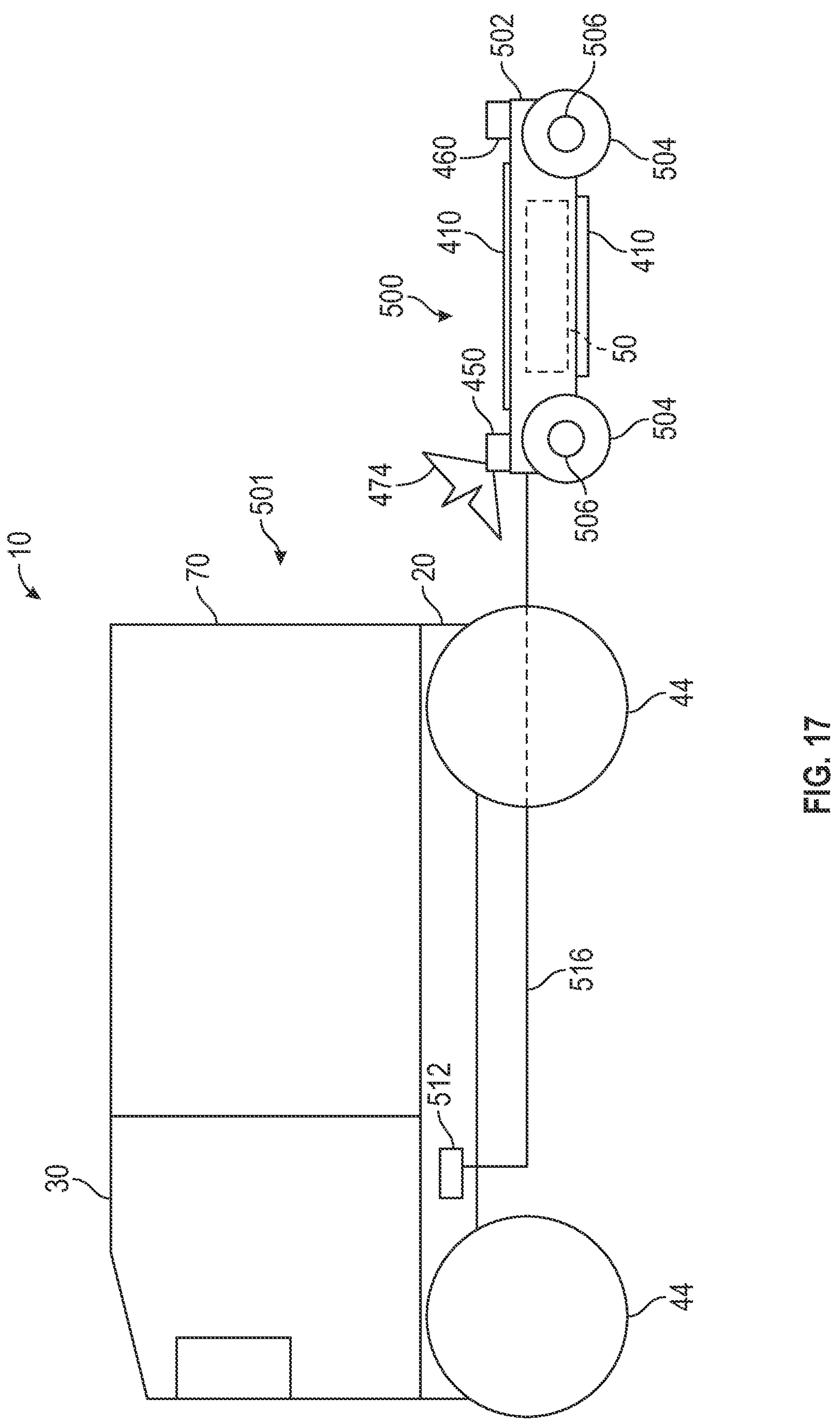
FIG. 17 is a side view of the vehicle of FIG. 1 including the charging cart of FIG. 16 in a deployed configuration.

Referring to FIGS. 16 and 17, in some embodiments the vehicle 10 includes a deployable portion, trailed portion, drone, or cart, shown as charging cart 500. The charging cart 500 can be selectively deployed from a main portion 501 of the vehicle 10 to move one or more charging coils 410 outward relative to the main portion 501. By way of example, the main portion 501 may include the chassis 20, the cab 30, the wheel and tire assemblies 44, the drive motors 52, and the body assembly 70, and any other components coupled thereto. FIG. 16 illustrates the charging cart 500 in a stored configuration, and FIG. 17 illustrates the charging cart 500 in a deployed configuration.

The charging cart 500 includes a chassis, shown as frame 502, that supports the other components of the charging cart 500. Rotatably coupled to the frame 502 is a series of tractive elements, shown as wheels 504. In some embodiments, the charging cart 500 includes a series of drivers (e.g., electric motors), shown as drive motors 506, that are configured to drive rotation of the wheels 504 (e.g., to steer and/or propel the charging cart 500). In other embodiments, the wheels 504 are free-spinning, and the charging cart 500 is dragged or trailed by the main portion of the vehicle 10. In some embodiments, the frame 502 supports one or more of the batteries 50 of the vehicle 10. In some embodiments, the charging cart 500 includes one or more cameras 450 and/or coil sensors 460 coupled to the frame 502.

The charging cart 500 is coupled to the main portion 501 of the vehicle 10 by a tether 510. The tether 510 may structurally couple the frame 502 to the chassis 20. By way of example, the tether 510 may include a cable that couples the frame 502 to the chassis 20, limiting movement of the frame 502 relative to the main portion 501. By way of another example, the tether 510 may include a frame that pivotally couples the frame 502 to the chassis 20. The tether 510 may electrically and/or communicatively couple the frame 502 to the main portion 501 of the vehicle 10. By way of example, the tether 510 may include one or more wires or cables that transfer electrical energy and/or data between the main portion 501 (e.g., the controller 402) and the charging cart 500. The controller 402 may control operation of the charging cart 500 (e.g., operation of the drive motors 506) through the tether 510.

Additionally or alternatively, the main portion 501 may communicate wirelessly with the charging cart 500. By way of example, the controller 402 may provide commands to the charging cart 500 wirelessly (e.g., through a Bluetooth connection, a Wi-Fi connection, an infrared connection, etc.). By way of another example, a charging coil 410 on the frame 502 may communicate electrical energy wirelessly to a charging coil 410 on the main portion 501. In one such example, a charging coil 410 on the top surface of the frame 502 communicates with a charging coil 410 on the bottom surface of the chassis 20 when the charging cart 500 is in the stored configuration.

An actuator, shown as cart actuator 512, selectively repositions the frame 502 relative to the chassis 20 to reconfigure the charging cart 500 between the stored and deployed configurations. In some embodiments, the cart actuator 512 includes a winch that selectively limits a working length of the tether 510, paying out or retracting the tether 510 to control the position of the charging cart 500 relative to the main portion 501. In some embodiments, the cart actuator 512 includes a latch that selectively fixedly couples the frame 502 to the chassis 20. In some embodiments, the cart actuator 512 includes a linear actuator that selectively lifts the charging cart 500 out of contact with the ground.

In the stored configuration, shown in FIG. 16, the cart actuator 512 holds the frame 502 in a first position below the chassis 20. In some embodiments, in the stored configuration, the footprint (e.g., the projection in a horizontal plane) of the charging cart 500 does not extend beyond (e.g., is completely contained within) the footprint of the main portion 501. The cart actuator 512 may fix the frame 502 to the chassis 20 or limit movement of the frame 502 to a reduced range of positions. In the stored configuration, the charging cart 500 may rest on the ground or may be held above the ground by the cart actuator 512. A charging coil 410 on the bottom of the frame 502 may communicate with an external charging coil 412 beneath the vehicle 10 in this configuration.

In the deployed configuration, the charging cart 500 is free to move outward relative to the vehicle 10. In some embodiments, the footprint of the charging cart 500 extends beyond (e.g., extends at least partially outside of) the footprint of the main portion 501. Accordingly, the charging coils 410 on the charging cart 500 may communicate with external charging coils 412 positioned beyond the main portion 501. The charging coils 410 on the charging cart 500 may facilitate communicating electrical energy with a device that can't be reached by the main portion 501 of the vehicle 10.

When in the deployed configuration and when reconfiguring the charging cart 500 between the stored and deployed configurations, the relative positions of the charging cart 500 and the main portion 501 may be controlled by the drive motors 506 and/or the cart actuator 512. By way of example, the cart actuator 512 may increase the working length of the tether 510 as the vehicle 10 drives forward to move the charging cart 500 rearward relative to the main portion 501. By way of another example, the controller 402 may control the drive motors 512 to move the charging cart 500 relative to the main portion 501. For example, a relative speed between the drive motors 506 and the drive motors 52 may control a distance between the charging cart 500 and the main portion 501 of the vehicle 10. Navigation feedback of the charging cart 500 may be facilitated by the coil sensors 460 and/or the cameras 450.

FIGS. 2-7, 18, and 19 illustrate various locations that a charging coil 410 may be integrated into the various configurations of the vehicle 10. Although various exemplary configurations are shown, it should be understood that the vehicles 10 may utilize other mounting configurations for the charging coils 410.

FIGS. 2-4, 18, and 19 illustrate various possible locations for the charging coils 410 when the vehicle 10 is configured as a front-loading refuse vehicle 100. As shown, a charging coil 410 is positioned along the front of the cab 30. A charging coil 410 is coupled to each of the front bumper 490 and the rear bumper 492. A charging coil 410 is coupled to the chassis 20 and positioned to face downward. A charging coil 410 is positioned along the right side of the refuse compartment 110. A charging coil 410 is positioned along the top side of the refuse compartment 110. In some embodiments, a charging coil 410 is positioned along the left side of the refuse compartment 110.

Figure 18:
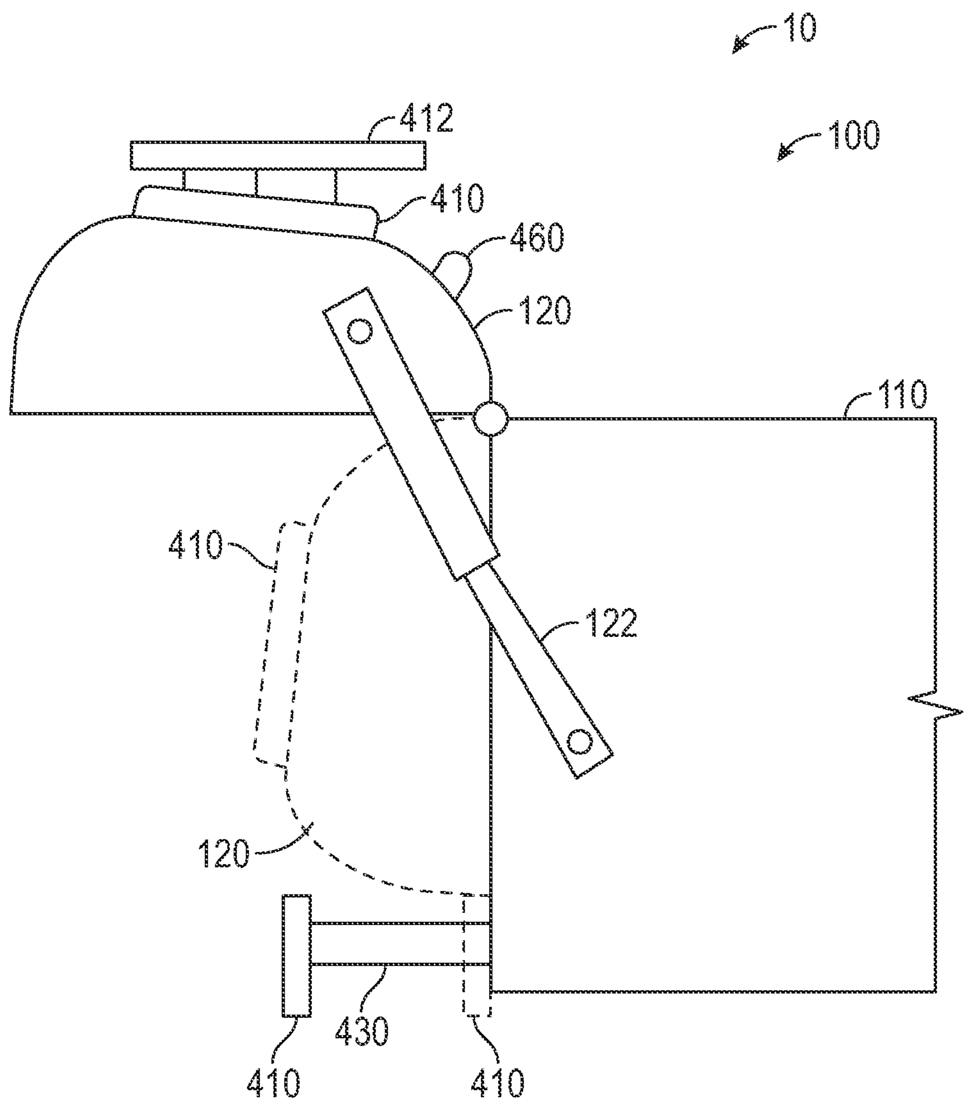
FIG. 18 is a partial side view of the vehicle of FIG. 2 with a tailgate pivoted to an open position.

Referring to FIGS. 2 and 18, a charging coil 410 is coupled to the tailgate 120. When the tailgate 120 is in a closed position (shown in dashed lines in FIG. 18), the charging coil 410 faces rearward. In such a configuration, the charging coil 410 may be positioned to communicate with an external charging coil 412 positioned rearward of the vehicle 10. When the tailgate 120 is in an opened position (shown in solid lines in FIG. 18), the charging coil 410 faces upward. In such a configuration, the charging coil 410 may be positioned to communicate with an external charging coil 412 positioned above the vehicle 10. When in the opened position, the controller 402 may control the actuators 122 to raise or lower the tailgate 120, thereby raising or lowering the corresponding charging coil 410. Accordingly, the tailgate actuators 122 may act as coil actuators 430 that change the position of the charging coil 410 relative to an external charging coil 412. A coil sensor 460 coupled to the tailgate 120 may provide feedback for use when controlling the tailgate actuators 122 to position the charging coil 410.

FIG. 18 further illustrates a charging coil 410 coupled to the refuse compartment 110 by a coil actuator 430. The coil actuator 430 is positioned to move the charging coil 410 longitudinally between a retracted position (shown in dashed lines in FIG. 18) and an extended position (shown in solid lines in FIG. 18). A distance between the charging coil 410 and the refuse compartment 110 may be greater in the extended position than in the retracted position.

As shown in FIG. 3, the lift assembly 130 may include one or more charging coils 410. As shown, a charging coil 410 is coupled to each lift arm 132. A charging coil 410 is coupled to the backing plate 136. A charging coil 410 is coupled to each lift fork 138. An electrical connector 420 is coupled to the end of each lift fork 138. The controller 402 may adjust the positions of the charging coils 410 coupled to the lift assembly 130 by controlling the lift arm actuators 134 and/or the articulation actuators 140. By way of example, the controller 402 may raise the lift arm actuators 134 to raise a charging coil 410 coupled to the backing plate 136 to communicate with an external charging coil 412 positioned above the vehicle 10. The controller 402 may adjust the orientation of this charging coil 410 using the articulation actuators 140 (e.g., to facilitate alignment of the charging coil 410). Accordingly, the lift arm actuators 134 and/or the articulation actuators 140 may act as the coil actuators 430.

Coil sensors 460 and/or cameras 450 may be positioned throughout the refuse vehicle 100 to facilitate alignment and positioning of the charging coils 410 throughout operation. Coil sensors 460 and/or cameras 450 may be coupled to the chassis 20, the cab 30, the refuse compartment 110, the tailgate 120, the lift assembly 130, or elsewhere throughout the refuse vehicle 10.

Figure 19:
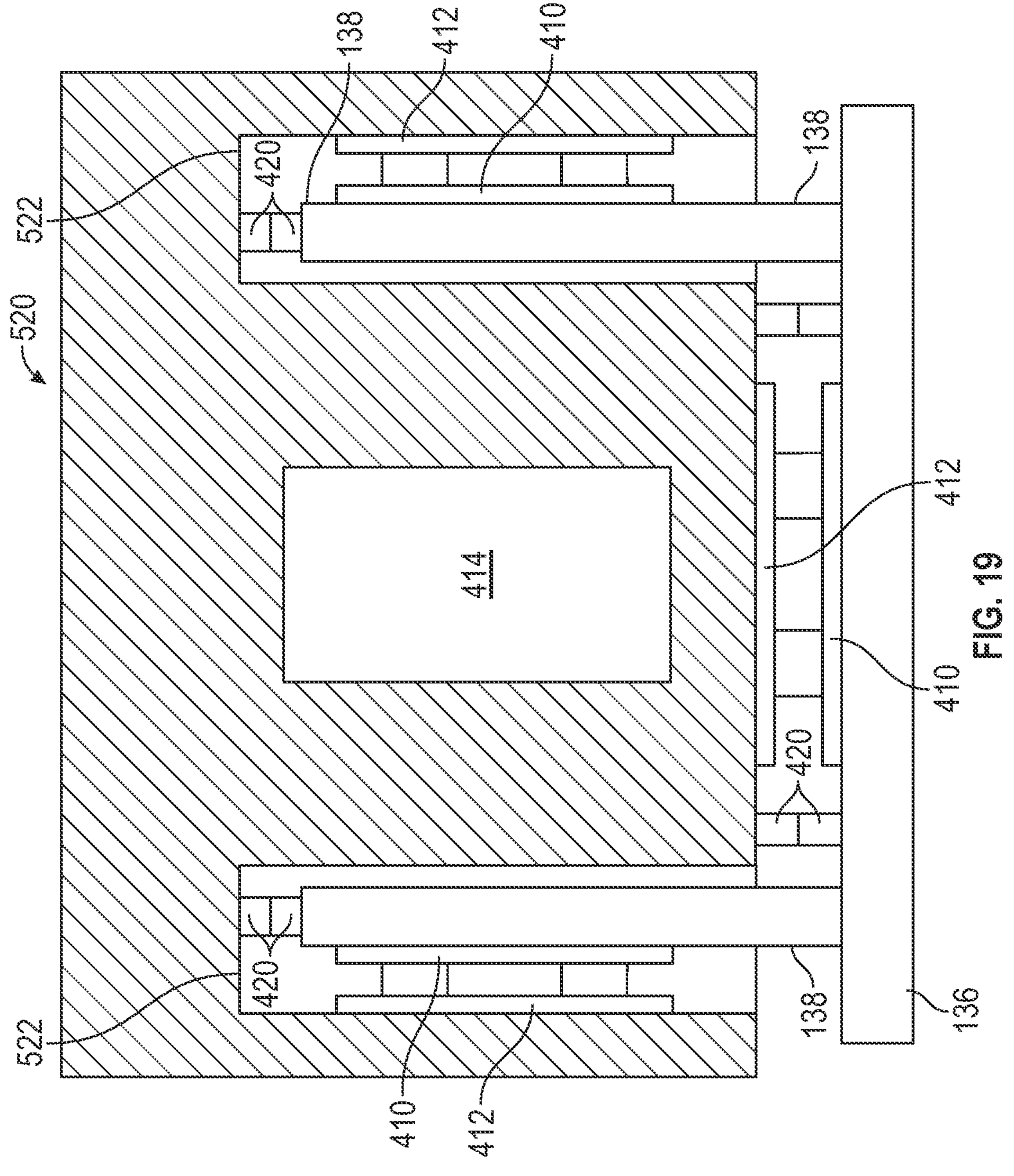
FIG. 19 is a section view of a fork receiver interacting with the vehicle of FIG. 2, according to an exemplary embodiment.

FIG. 19 illustrates how the lift assembly 130 may interact with an object that receives the lift forks 138, shown as fork receiver 520, to transfer power to or from the vehicle 10. The fork receiver 520 defines a pair of recesses or passages, shown as fork pockets 522, that are each configured to receive one of the lift forks 138. The fork receiver 520 may be an object that is configured to be lifted by the lift assembly 130, such as a refuse container (e.g., the refuse container 530) or the carry can 150. In other embodiments, the fork receiver 520 may be a stationary device that is not configured to be lifted by the vehicle 10, such as a stationary charging station or a portion of a building.

In the embodiment shown in FIG. 19, the fork receiver 520 includes an external device 414 (e.g., a connection to a power grid, batteries, etc.) that is electrically coupled to a series of external charging coils 412 and connectors 420. These external charging coils 412 and connectors 420 are placed in communication with charging coils 410 and connectors 420 of the lift assembly 130, respectively, when the lift forks 138 are fully seated within the fork pockets 522.

Through these connections, power is communicated between the external device 414 and the vehicle 10.

In the configuration shown in FIG. 19, an external charging coil 412 is positioned along an outer face of the fork receiver 520. When the lift forks 138 are positioned within the fork pockets 522, this external charging coil 412 communicates with a charging coil 410 coupled to the backing plate 136. A connector 420 is positioned along an outer face of the fork receiver 520. When the lift forks 138 are positioned within the fork pockets 522, this connector 420 engages and communicates with a connector 420 coupled to the backing plate 136. An external charging coil 412 is positioned within each of the fork pockets 522. When the lift forks 138 are positioned within the fork pockets 522, these external charging coils 412 communicate with charging coils 410 coupled to the lift forks 138. A connector 420 is positioned at the deepest point of each fork pocket 522. When the lift forks 138 are positioned within the fork pockets 522, these connectors 420 each engage and communicate with a connector coupled to a distal end of each lift fork 138.

In some embodiments, the fork receiver 520 is a refuse container. By way of example, in the embodiment shown in FIG. 2, the refuse vehicle 100 is shown with the lift assembly 130 in the process of lifting a dumpster, shown as refuse container 530. The refuse container 530 includes a series of energy storage devices, shown as batteries 532. A wireless charging interface, shown as wireless charging coil 534, is positioned along a bottom surface of the refuse container 530. The refuse container 530 may be configured as the fork receiver 520, such that the vehicle 10 is electrically coupled with the refuse container 530 when the lift assembly 130 engages the refuse container 530. In operation, the lift assembly 130 interfaces with the refuse container 530 and empties refuse from the refuse container 530 into the refuse compartment 110. When the lift assembly 130 is engaged with the refuse container 530, the refuse container 530 becomes electrically coupled to the refuse vehicle 100 (e.g., as shown in FIG. 19), and electrical energy from the batteries 532 is transferred to the vehicle 10 to charge the batteries 50. When the lift assembly 130 returns the refuse container 530 to the ground, the wireless charging coil 534 may communicate with another wireless charging coil on the ground (e.g., coupled to a power grid) to charge the batteries 532. The refuse vehicle 100 may interact with several of the refuse containers 530 throughout completion of the route, thereby extending the operating duration of the refuse vehicle 100 before the refuse vehicle 100 is required to return to a base of operations to charge.

In some embodiments, the fork receiver 520 is configured as a carry can. By way of example, in the embodiment shown in FIG. 4, the refuse vehicle 100 is shown with the lift assembly 130 coupled to the carry can 150. A charging coil 410 is positioned along a bottom surface of the container 152 of the carry can 150. Another charging coil is coupled to the base 162 of the grabber assembly 160. In some embodiments, the carry can 150 includes one or more batteries 50. The carry can 150 may be configured as the fork receiver 520, such that the vehicle 10 is electrically coupled with the carry can 150 when the lift assembly 130 engages the carry can 150. In operation, the lift assembly 130 interfaces with the carry can 150, electrically coupling the carry can 150 to the vehicle 10. The vehicle 10 may then utilize the charging coil 410 positioned on the bottom of the carry can 150 to communicate with an external charging coil 412. The drive motors 52, the lift arm actuators 134 and/or the articulation actuators 140 may be used to position and align the carry can 150 with the external charging coil 412.

The carry can 150 may be configured to engage a refuse container 530 using the grabber assembly 160. As shown, the refuse container 530 is configured as a residential garbage can. When the grabber assembly 160 is engaged with the refuse container 530, the charging coil 410 aligns with the wireless charging coil 534, electrically coupling the refuse container 530 to the carry can 150. Electrical energy from the batteries 532 may be transferred to the vehicle 10 through the carry can 150 to charge the batteries 50. When the carry can 150 returns the refuse container 530 to the ground, the wireless charging coil 534 may communicate with another wireless charging coil (e.g., coupled to a power grid) to charge the batteries 532. Alternatively, a user (e.g., a customer) may directly couple the refuse container 530 to a power grid. The refuse vehicle 100 may interact with several of the refuse containers 530 throughout completion of the route, thereby extending the operating duration of the refuse vehicle 100 before the refuse vehicle 100 is required to return to a base of operations to charge.

FIGS. 5 and 18 illustrate various possible locations for the charging coils 410 when the vehicle 10 is configured as a side-loading refuse vehicle 100. The side-loading refuse vehicle 100 of FIG. 5 may be substantially similar to the front-loading refuse vehicle 100 of FIG. 2, except as indicated in the figures or as otherwise specified. As shown, a charging coil 410 is positioned along the front of the cab 30. A charging coil 410 is coupled to each of the front bumper 490 and the rear bumper 492. A charging coil 410 is coupled to the chassis 20 and positioned to face downward. A charging coil 410 is positioned along the right side of the refuse compartment 110. A charging coil 410 is positioned along the top side of the refuse compartment 110. A charging coil 410 is coupled to the tailgate 120. In some embodiments, a charging coil 410 is positioned along the left side of the refuse compartment 110.

Similar to the embodiment shown in FIG. 4, a charging coil 410 is coupled to the base 162 of the grabber assembly 160. This charging coil 410 can be repositioned vertically by the grabber lift actuator 176. This charging coil 410 can be repositioned laterally by the grabber extension actuator 174.

Coil sensors 460 and/or cameras 450 may be positioned throughout the refuse vehicle 100 to facilitate alignment and positioning of the charging coils 410 throughout operation. Coil sensors 460 and/or cameras 450 may be coupled to the chassis 20, the cab 30, the refuse compartment 110, the tailgate 120, the lift assembly 170, or elsewhere throughout the refuse vehicle 100.

FIG. 6 illustrates various possible locations for the charging coils 410 when the vehicle 10 is configured as a front-loading concrete mixer truck 200. As shown, a charging coil 410 is positioned along the front of the cab 30. A charging coil 410 is coupled to each of the front bumper 490 and the rear bumper 492. A charging coil 410 is coupled to the chassis 20 and positioned to face downward. A charging coil 410 is positioned along the left side of the chassis 20. A charging coil 410 is positioned along the top side of the body assembly 70. A charging coil 410 is positioned along the rear side of the body assembly 70. In some embodiments, a charging coil 410 is positioned along the right side of the chassis 20.

Coil sensors 460 and/or cameras 450 may be positioned throughout the mixer truck 200 to facilitate alignment and positioning of the charging coils 410 throughout operation. Coil sensors 460 and/or cameras 450 may be coupled to the chassis 20, the cab 30, the drum assembly 210, or elsewhere throughout the mixer truck 200.

FIG. 7 illustrates various possible locations for the charging coils 410 when the vehicle 10 is configured as a fire fighting vehicle 300. As shown, a charging coil 410 is positioned along the front of the cab 30. A charging coil 410 is coupled to the chassis 20 and positioned to face downward. A charging coil 410 is positioned along the top side of the body assembly 70. In some embodiments, a charging coil 410 is positioned along the right side, the left side, and/or the rear side of the chassis 20.

A charging coil 410 is coupled to the distal end of the ladder assembly 320. This charging coil 410 can be repositioned vertically, laterally, and longitudinally by the ladder actuators 326. A charging coil 410 is coupled to each outrigger 310. These charging coils 410 can be repositioned laterally and vertically by the outriggers 310.

Coil sensors 460 and/or cameras 450 may be positioned throughout the refuse vehicle 100 to facilitate alignment and positioning of the charging coils 410 throughout operation. Coil sensors 460 and/or cameras 450 may be coupled to the chassis 20, the cab 30, the refuse compartment 110, the tailgate 120, the lift assembly 170, or elsewhere throughout the refuse vehicle 10.

In some embodiments, the vehicle 10 is configured to communicate with another vehicle (e.g., another vehicle 10). In such a configuration, the vehicle 10 may approach the second vehicle, or the second vehicle may approach the vehicle 10. The second vehicle may transfer electrical energy to the vehicle 10 (e.g., to charge the batteries 50). Alternatively, the vehicle 10 may transfer electrical energy to the vehicle 10. The vehicle 10 may communicate electrical energy with the second vehicle 10 through the connectors 420 and/or through the charging coils 410.

Thermal Management System

When receiving or transferring energy, the charging coil 410 of the vehicle 10 outputs waste energy as heat. Due to the large power requirements to drive the vehicle 10 and the associated high voltages and/or currents, the charging coil 410 may output large amounts of thermal energy. This thermal energy may be transferred to other areas of the vehicle 10 to beneficially warm certain portions of the vehicle 10. By way of example, the thermal energy may be transferred to the cab interior 32 of the cab 30 to precondition the cab 30 on cold days, ensuring operator comfort. By way of another example, the thermal energy may be transferred to the batteries 50 to maintain a desired operating temperature of the batteries 50. If the temperature of the batteries 50 were to drop below the desired operating temperature, or move outside of a predetermined range of operating temperatures, the operating capacity of the batteries 50 could be diminished. If the thermal energy is not desired within the vehicle 10, the thermal energy may be dispensed to the surrounding atmosphere by one or more radiators.

Figure 20:
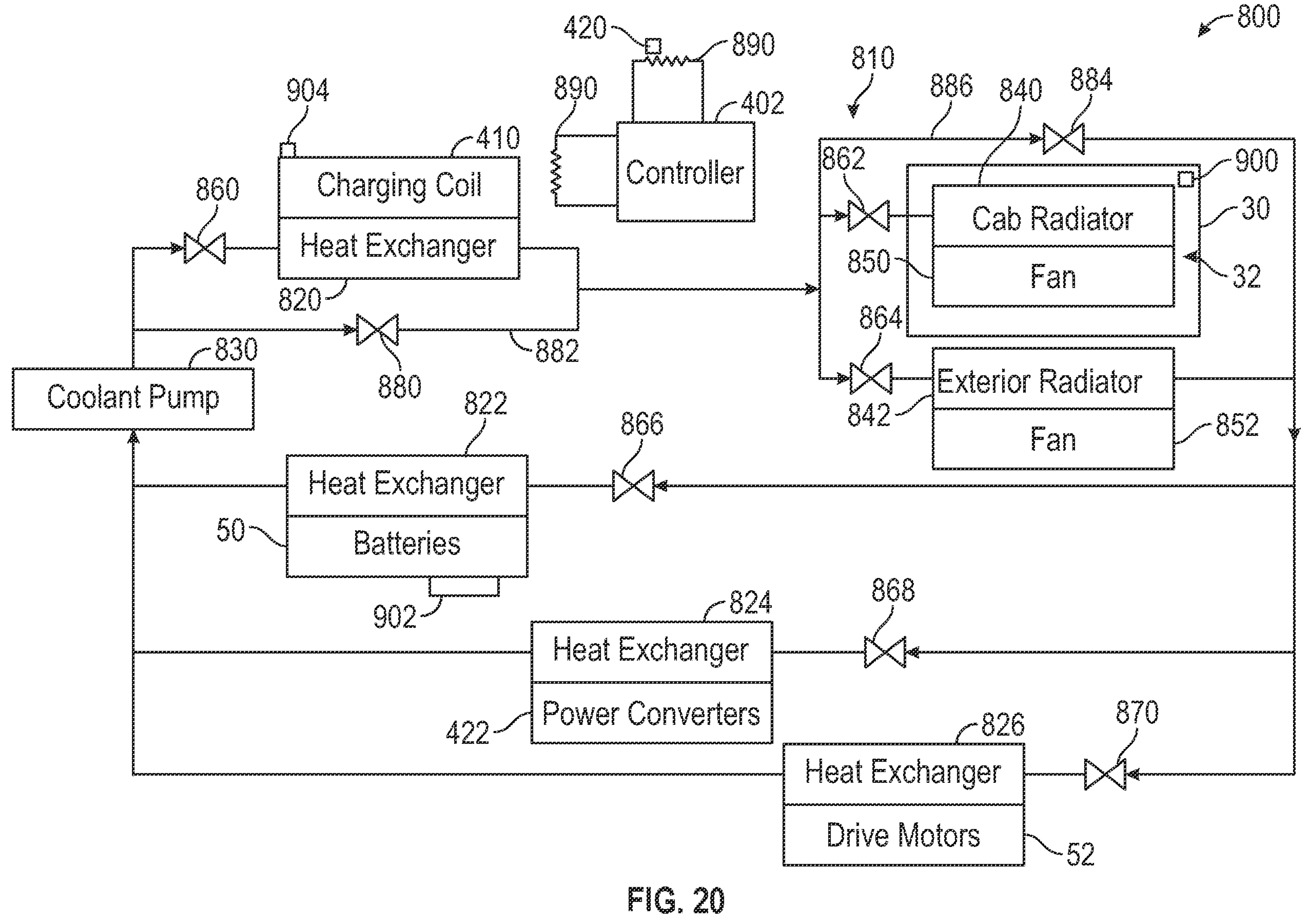
FIG. 20 is a hydraulic schematic of a thermal management system of the vehicle of FIG. 1, according to an exemplary embodiment.

Referring to FIG. 20, the vehicle 10 includes a heat dissipation system, a heating, ventilation, and air conditioning (HVAC) system, a temperature control system, or a thermal management system, shown as thermal management system 800. The thermal management system 800 is configured to vary the temperatures of one or more components of the vehicle 10 and/or one or more spaces/volumes within the vehicle 10. By way of example, the thermal management system 800 may cool one or more components of the vehicle 10 that generate heat during operation. By way of another example, the thermal management system 800 may provide heated air to the cab interior 32.

Referring to FIG. 20, the thermal management system 800 includes a heat transfer circuit, shown as coolant circuit 810. The coolant circuit 810 is configured to transfer thermal energy to or from one or more components of the vehicle 10 (e.g., to the surrounding atmosphere, to another component, etc.). The coolant circuit 810 includes one or more heat transfer devices (e.g., water jackets, fins, etc.), shown as heat exchangers, that place one or more components in thermal communication with the coolant circuit 810. One heat exchanger may be coupled to multiple components. Alternatively, each component may be coupled to a separate heat exchanger.

As shown, a heat exchanger 820 is thermally coupled to the charging coil 410. The heat exchanger 820 is configured to transfer thermal energy between the charging coil 410 and the coolant within the coolant circuit 810. A heat exchanger 822 is thermally coupled to the batteries 50. The heat exchanger 822 is configured to transfer thermal energy between the batteries 50 and the coolant within the coolant circuit 810. A heat exchanger 824 is thermally coupled to the power converters 422. The heat exchanger 824 is configured to transfer thermal energy between the power converters 422 and the coolant within the coolant circuit 810. A heat exchanger 826 is thermally coupled to the drive motors 52. The heat exchanger 826 is configured to transfer thermal energy between the drive motors 52 and the coolant within the coolant circuit 810. In other embodiments, heat exchangers are coupled to other components of the vehicle 10. By way of example, heat exchangers may be coupled to pumps, compressors, actuators, or other components of the vehicle 10 that generate thermal energy during operation.

The heat exchangers 820, 822, 824, 826 are fluidly coupled to a driver or actuator, shown as coolant pump 830. The coolant pump 830 is configured to receive coolant at a low pressure and provide, at an outlet, a flow of fluid at an elevated pressure. As shown, an inlet of the coolant pump 830 is fluidly coupled to the heat exchangers 822, 824, and 826, such that the coolant pump 830 is downstream of the heat exchangers 822, 824, and 826. In other embodiments, the coolant pump 830 is positioned elsewhere within the coolant circuit 810.

The thermal management system 800 further includes a pair of heat dissipaters or radiator cores, shown as cab radiator 840 and exterior radiator 842. The cab radiator 840 and the exterior radiator 842 are fluidly coupled to the coolant circuit 810. The cab radiator 840 is in thermal communication with the cab interior 32. The exterior radiator 842 is in thermal communication with the atmosphere surrounding the vehicle 10. In operation, heated coolant flows through the cab radiator 840 and/or the exterior radiator 842. The cab radiator 840 transfers thermal energy from the coolant into the cab interior 32. The exterior radiator 842 transfers thermal energy from the coolant into the atmosphere surrounding the vehicle 10.

In some embodiments, the thermal management system 800 further includes a pair of air movers or blowers, shown as fan 850 and fan 852. The fan 850 is coupled to the cab radiator 840. The fan 850 is positioned to direct air (e.g., from the cab interior 32, from the atmosphere surrounding the vehicle 10, etc.) through the cab radiator 840 (e.g., across fins of the cab radiator 840). The fan 852 is coupled to the exterior radiator 842. The fan 852 is positioned to direct air (e.g., from the atmosphere surrounding the vehicle 10, etc.) through the exterior radiator 842 (e.g., across fins of the exterior radiator 842). The fans 850 and 852 may increase the heat transfer from the corresponding radiator to the cab interior 32 and/or the surrounding atmosphere.

A series of valves may be used to control the flow of coolant throughout the coolant circuit 810. Shutoff valves may be positioned directly upstream of a corresponding element of the coolant circuit 810, selectively preventing fluid from flowing into the element. Although shutoff valves are shown upstream of various components, the thermal management system 800 may include additional shutoff valves downstream of the elements as well. Bypass valves may be positioned along bypass lines to facilitate fluid flow bypassing the element. In some embodiments, the shutoff valves and the bypass valves are electronically controlled (e.g., by the controller 402) via one or more electronic actuators (e.g., solenoids).

A first shutoff valve, shown as charging coil shutoff valve 860, is positioned upstream of the heat exchanger 820 coupled to the charging coil 410. The charging coil shutoff valve 860 selectively prevents fluid from entering the heat exchanger 820 coupled to the charging coil 410. A second shutoff valve, shown as cab radiator shutoff valve 862, is positioned upstream of the cab radiator 840. The cab radiator shutoff valve 862 selectively prevents fluid from entering the cab radiator 840. A third shutoff valve, shown as exterior radiator shutoff valve 864, is positioned upstream of the exterior radiator 842. The exterior radiator shutoff valve 864 selectively prevents fluid from entering the exterior radiator 842. A fourth shutoff valve, shown as battery shutoff valve 866, is positioned upstream of the heat exchanger 822 coupled to the batteries 50. The battery shutoff valve 866 selectively prevents fluid from entering the heat exchanger 822 coupled to the batteries 50. A fifth shutoff valve, shown as power converter shutoff valve 868, is positioned upstream of the heat exchanger 824 coupled to the power converters 422. The power converter shutoff valve 868 selectively prevents fluid from entering the heat exchanger 824 coupled to the power converters 422. A sixth shutoff valve, shown as drive motor shutoff valve 870, is positioned upstream of the heat exchanger 826 coupled to the drive motors 52. The drive motor shutoff valve 870 selectively prevents fluid from entering the heat exchanger 826 coupled to the drive motors 52.

A first bypass valve, shown as bypass valve 880, is positioned along a bypass line 882 that extends around the heat exchanger 820. When opened, the bypass valve 880 permits coolant to bypass the heat exchanger 820 through the bypass line 882. A second bypass valve, shown as bypass valve 884, is positioned along a bypass line 886 that extends around the cab radiator 840 and the exterior radiator 842. When opened, the bypass valve 884 permits coolant to bypass the cab radiator 840 and the exterior radiator 842 through the bypass line 886.

In operation, the coolant pump 830 supplies a pressurized flow of coolant. The coolant passes through the heat exchanger 820 and/or the bypass line 882. The coolant then passes through the cab radiator 840, the exterior radiator 842, and/or the bypass line 886. The coolant then passes through the heat exchanger 822, the heat exchanger 824, and/or the heat exchanger 826. The coolant then returns to the coolant pump 830 for recirculation.

In some embodiments, the thermal management system 800 includes a heating element, shown as heater 890. The heater 890 is thermally coupled to the charging coil 410 and configured to supply thermal energy to heat the charging coil 410. Another heater 890 may be thermally coupled to an electrical connector 420. In some embodiments, the heaters 890 are resistive heating elements that are configured to provide thermal energy in response to receiving electrical energy from the controller 402. Accordingly, the controller 402 may control operation of the heaters 890.

In operation, the vehicle 10 may start out in a cold environment, which may be undesirable for several of the components. By way of example, ice may build up on the charging coil 410, reducing the effectiveness of the wireless power transfer of the charging coil 410. Ice may build up on the connector 420, preventing the connector 420 from being connected or disconnected. By way of another example, operator comfort may suffer when the temperature within the cab 30 falls below a threshold temperature. By way of another example, the performance (e.g., battery life, ability to hold a charge, current output, etc.) of the batteries 50 may degrade when the batteries 50 are below a threshold temperature.

To counteract the buildup of ice on the charging coil 410, a heater 890 may be used to provide thermal energy and melt (e.g., defrost) any ice that has built up on the charging coil 410. For example, a temperature sensor may detect an ambient temperature and report the ambient temperature to the controller 402. If the ambient temperature is below a cold threshold at or before startup of the vehicle, the controller 402 may instruct the heater 890 to provide thermal energy to and heat the charging coil 410. Similarly, a heater 890 may be used to provide thermal energy and melt (e.g., defrost) any ice that has built up on the connector 420. After the ice has been removed, the heaters 890 may be shut off.

The vehicle 10 may charge wirelessly through the charging coil 410 while the vehicle 10 is otherwise idle. As the vehicle 10 charges, the charging coil 410 outputs thermal energy. The power converters 422 may also output thermal energy (e.g., when converting AC input power to DC energy for storage in the batteries 50). The thermal energy from the charging coil 410 and/or the power converters 422 may be transferred into the coolant circuit 810 by the heat exchanger 820 and the heat exchanger 824. The coolant circuit 810 may transfer a portion (e.g., a first portion) of this thermal energy to the cab interior 32 through the cab radiator 840. Beneficially, this heats the cab interior 32 to within a desired temperature range while dissipating the thermal energy from the charging coil 410 and the power converters 422. A temperature sensor 900 may be positioned to measure the temperature within the cab interior 32 and report the measured temperature to the controller 402. If the controller 402 detects that the temperature within the cab interior 32 has exceeded a desired temperature range, the controller 402 may activate the cab radiator shutoff valve 862 to prevent coolant from entering the cab radiator 840 and further heating the cab interior 32.

The coolant circuit 810 may transfer another portion (e.g., a second portion) of the thermal energy from the charging coil 410 and/or the power converters 422 to the batteries 50 through the heat exchanger 822. Beneficially, this heats the batteries 50 to within a desired temperature range (e.g., predetermined range of operating temperatures), while dissipating the thermal energy from the charging coil 410 and the power converters 422. A temperature sensor 902 may be positioned to measure the temperature of the batteries 50 and report the measured temperature to the controller 402. If the controller 402 detects that the temperature of the batteries 50 has exceeded the desired temperature range, the controller 402 may activate the battery shutoff valve 866 to prevent coolant from entering the heat exchanger 822 and further heating the cab interior 32.

If both the batteries 50 and the cab interior 32 are above their respective desired temperature ranges, the controller 402 may open the exterior radiator shutoff valve 864 and close the bypass valve 884, causing the coolant heated by the charging coil 410 to pass through the exterior radiator 842. The exterior radiator 842 removes thermal energy from the coolant (e.g., by expelling heat to the atmosphere), which subsequently returns to cool the charging coil 410. The exterior radiator 842 may continue performing this function until the batteries 50 and/or the cab interior 32 fall below their respective desired temperature ranges. At this time, the controller 402 may reopen the shutoff valves to begin heating the batteries 50 and/or the cab interior 32.

When the vehicle 10 is being operated, the frequency with which the vehicle 10 is charged decreases (e.g., the charging coil 410 may be less active or completely turned off). In such a configuration, the thermal energy output of the charging coil 410 decreases. Accordingly, the charging coil shutoff valve 860 may be closed, and the bypass valve 880 may be opened to bypass the heat exchanger 820.

During operation of the vehicle 10, the batteries 50, the power converters 422, and the drive motors 52 all provide thermal energy, which is transferred to the coolant by the heat exchanger 822, the heat exchanger 824, and the heat exchanger 826, respectively. This thermal energy may be dissipated by the cab radiator 840 and/or the exterior radiator 842.

In some embodiments, after the charging coil 410 has cooled, coolant is passed through the heat exchanger 820, and the charging coil 410 acts as a radiator. By way of example, a temperature sensor 904 may be positioned to measure the temperature of the charging coil 410 and report the measured temperature to the controller 402. If the controller 402 detects that the temperature of the charging coil 410 has fallen below a threshold temperature, the controller 402 may close the bypass valve 880 and open the charging coil shutoff valve 860, permitting the coolant to pass through the heat exchanger 820. Beneficially, the heat exchanger 820 may provide thermal energy from the coolant to charging coil 410, and the large surface area of the charging coil 410 may dissipate the thermal energy to the surrounding atmosphere.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 as shown in the various exemplary embodiments is illustrative only. Additionally, any element disclosed in one embodiment may be incorporated or utilized with any other embodiment disclosed herein. For example, the camera 450 of the exemplary embodiment shown in at least FIG. 13 may be incorporated in the vehicle 10 of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A thermal management system for a vehicle, comprising:

a wireless charging coil configured to provide thermal energy;

a first heat exchanger thermally coupled to the wireless charging coil;

a radiator thermally coupled to the first heat exchanger and configured to transfer a first portion of the thermal energy provided by the wireless charging coil to an interior of a passenger compartment of the vehicle;

a second heat exchanger thermally coupled to the first heat exchanger and configured to transfer a second portion of the thermal energy provided by the wireless charging coil to a battery of the vehicle; and an exterior radiator and an exterior radiator shutoff valve arranged upstream of the exterior radiator, wherein the exterior radiator shutoff valve is configured to open and expel thermal energy from the wireless charging coil when a temperature within the passenger compartment exceeds a cab temperature threshold and a temperature of the battery exceeds a battery temperature threshold.

2. The thermal management system of claim 1, further comprising a cab shutoff valve arranged upstream of the radiator and a cab temperature sensor arranged within the passenger compartment.

3. The thermal management system of claim 2, wherein the cab shutoff valve is configured to close when a temperature in the passenger compartment exceeds a temperature threshold.

4. The thermal management system of claim 1, further comprising a battery shutoff valve arranged upstream of the second heat exchanger and a battery temperature sensor configured to detect a temperature of the battery.

5. The thermal management system of claim 4, wherein the battery shutoff valve is configured to close when the temperature of the battery exceeds a temperature threshold.

6. The thermal management system of claim 1, wherein the second heat exchanger is arranged downstream of the first heat exchanger.

7. The thermal management system of claim 1, further comprising a heater configured to supply thermal energy to the wireless charging coil at startup of the vehicle when an ambient temperature is below a cold threshold.

8. A thermal management system for a vehicle, comprising:

a wireless charging coil;

a coolant pump configured to provide a flow of fluid at an outlet;

a first heat exchanger thermally coupled to the wireless charging coil and arranged downstream of the outlet;

a second heat exchanger thermally coupled to a battery of the vehicle and arranged downstream of the first heat exchanger, wherein the first heat exchanger transfers heat energy output by the wireless charging coil to the flow of fluid, and the second heat exchanger receives the flow of fluid and transfers heat from the flow of fluid to the battery;

a radiator in thermal communication with a cab interior of the vehicle and configured to receive heat energy from the flow of fluid to transfer heat to the cab interior; and a cab shutoff valve arranged upstream of the radiator and a cab temperature sensor arranged within the cab interior.

9. The thermal management system of claim 8, further comprising an exterior radiator and an exterior radiator shutoff valve arranged upstream of the exterior radiator, wherein the exterior radiator shutoff valve is configured to open and expel thermal energy from the flow of fluid when a temperature within the cab interior exceeds a cab temperature threshold and a temperature of the battery exceeds a battery temperature threshold.

10. The thermal management system of claim 8, wherein the cab shutoff valve is configured to close when a temperature in the cab interior exceeds a temperature threshold.

11. The thermal management system of claim 8, further comprising a battery shutoff valve arranged upstream of the second heat exchanger and a battery temperature sensor configured to detect a temperature of the battery.

12. The thermal management system of claim 11, wherein the battery shutoff valve is configured to close when the temperature of the battery exceeds a temperature threshold.

13. A vehicle, comprising:

a chassis;

a cab supported on the chassis and defining a cab interior;

a battery;

a wireless charging coil adapted to receive electrical energy from an external wireless charging coil and supply the electrical energy to the battery;

a thermal management system, including:

a first heat exchanger thermally coupled to the wireless charging coil and configured to receive thermal energy from the wireless charging coil;

a second heat exchanger thermally coupled to the battery and configured to supply thermal energy from the wireless charging coil to the battery;

a battery temperature sensor configured to detect a temperature of the battery; and a battery shutoff valve arranged upstream of the second heat exchanger; and a controller in communication with the wireless charging coil and the battery temperature sensor, the controller including a processor and a memory, wherein the memory stores instructions that, when executed by the processor, cause the processor to:

detect the temperature of the battery; and instruct the battery shutoff valve to close if the temperature of the battery is above a threshold temperature.

14. The vehicle of claim 13, wherein the thermal management system further comprises a cab radiator in thermal communication with the cab interior, and a cab temperature sensor configured to measure a temperature within the cab interior.

15. The vehicle of claim 14, wherein the cab radiator is configured to receive thermal energy from the wireless charging coil to heat the cab interior.

16. The vehicle of claim 13, wherein the thermal management system further comprises a heater in communication with the controller.

17. The vehicle of claim 16, wherein the controller is further configured to instruct the heater to supply thermal energy to the wireless charging coil at startup of the vehicle when an ambient temperature is below a cold threshold.

18. A thermal management system for a vehicle, comprising:

a wireless charging coil;

a coolant pump configured to provide a flow of fluid at an outlet;

a first heat exchanger thermally coupled to the wireless charging coil and arranged downstream of the outlet;

a second heat exchanger thermally coupled to a battery of the vehicle and arranged downstream of the first heat exchanger, wherein the first heat exchanger transfers heat energy output by the wireless charging coil to the flow of fluid, and the second heat exchanger receives the flow of fluid and transfers heat from the flow of fluid to the battery; and a battery shutoff valve arranged upstream of the second heat exchanger and a battery temperature sensor configured to detect a temperature of the battery.

19. The thermal management system of claim 18, wherein the battery shutoff valve is configured to close when the temperature of the battery exceeds a temperature threshold.

* * * * *